(12) United States Patent
Tufenkji et al.

(10) Patent No.: US 11,305,258 B2
(45) Date of Patent: Apr. 19, 2022

(54) NANOCOMPOSITE HYDROGELS AND METHODS OF USING SAME IN PURIFYING A FLUID

(71) Applicant: THE ROYAL INSTITUTION FOR THE ADVANCEMENT OF LEARNING/MCGILL UNIVERSITY, Montréal (CA)

(72) Inventors: Nathalie Tufenkji, Laval (CA); Nariman Yousefi, Montréal (CA); Zeinab Hosseinidoust, Montréal (CA); Kerwin Wong, Montréal (CA)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 267 days.

(21) Appl. No.: 16/326,476

(22) PCT Filed: Aug. 18, 2017

(86) PCT No.: PCT/CA2017/050983
§ 371 (c)(1),
(2) Date: Feb. 19, 2019

(87) PCT Pub. No.: WO2018/032114
PCT Pub. Date: Feb. 22, 2018

(65) Prior Publication Data
US 2020/0360895 A1 Nov. 19, 2020

Related U.S. Application Data

(60) Provisional application No. 62/377,105, filed on Aug. 19, 2016.

(51) Int. Cl.
*B01J 20/30* (2006.01)
*C01B 32/198* (2017.01)
*B01J 20/20* (2006.01)
*B01J 20/24* (2006.01)
*B01J 20/28* (2006.01)
*C02F 1/28* (2006.01)
*B82Y 30/00* (2011.01)
*B82Y 40/00* (2011.01)
*C02F 101/20* (2006.01)

(52) U.S. Cl.
CPC ......... *B01J 20/3078* (2013.01); *B01J 20/205* (2013.01); *B01J 20/24* (2013.01); *B01J 20/28007* (2013.01); *B01J 20/28047* (2013.01); *C01B 32/198* (2017.08); *C02F 1/288* (2013.01); *B82Y 30/00* (2013.01); *B82Y 40/00* (2013.01); *C02F 2101/20* (2013.01)

(58) Field of Classification Search
CPC ...... B01J 20/30; B01J 20/3078; B01J 20/205; B01J 20/24; B01J 20/28007; B01J 20/28047; B82Y 30/00; B82Y 40/00; C01B 32/198; C02F 1/288; C02F 2101/20
USPC ......................................................... 502/405
See application file for complete search history.

(56) References Cited

FOREIGN PATENT DOCUMENTS

| CN | 105061782 A | 11/2015 |
| CN | 106187269 A | 12/2016 |

OTHER PUBLICATIONS

International Search Report of PCT/CA2017/050983.
Machine translation of CN106187269A.
Machine translation of CN105061782A.

*Primary Examiner* — Edward M Johnson
(74) *Attorney, Agent, or Firm* — Norton Rose Fulbright Canada LLP

(57) ABSTRACT

There is provided herein a method for preparing a graphene oxide (GO) hydrogel. The method comprises the steps of adding vitamin C (VC) to a dispersion GO in a ratio GO:VC varying from 1:50 to 1:300; and incubating at a temperature above 45° C., preferably at 95° C. the dispersion for a time sufficient for a porous hydrogel to be self-assembled from the dispersion. CNPs can also be added to the hydrogel in a ratio GO:CNPs from 4:1 to 1:1. There is also provided the hydrogel so obtained and its use for removing contaminants from a fluid. The hydrogel can also be used as a filter for such decontamination.

5 Claims, 23 Drawing Sheets

Time

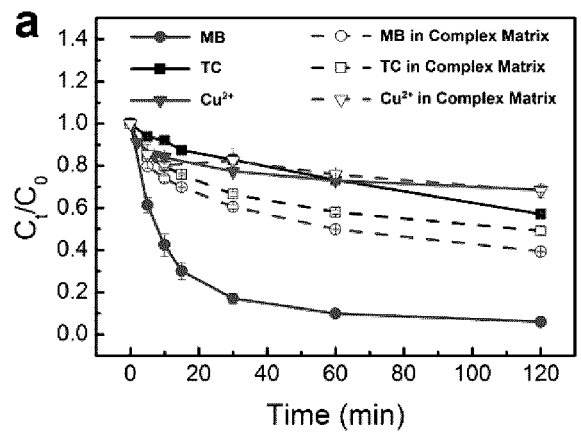
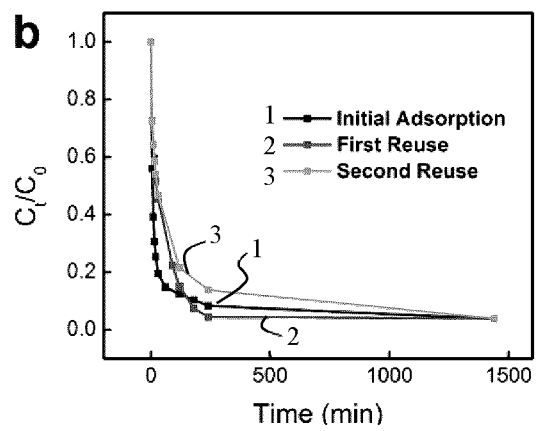
Fig. 22A
Fig. 22B
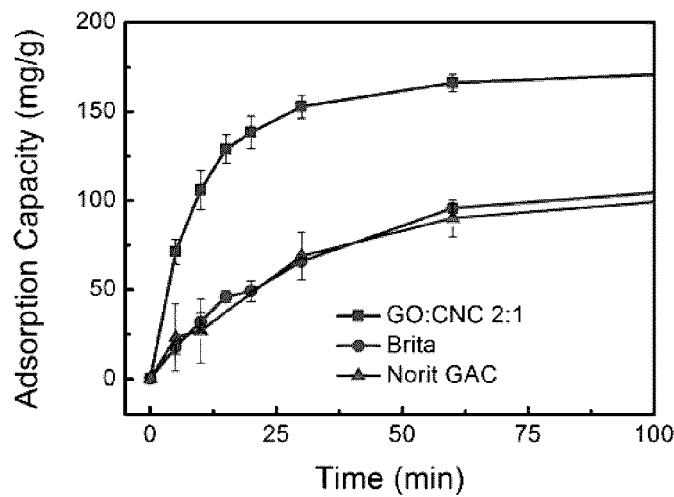
Fig. 22C

NANOCOMPOSITE HYDROGELS AND METHODS OF USING SAME IN PURIFYING A FLUID

FIELD OF THE INVENTION

This invention relates to fluid treatment and more particularly to graphene oxide nanoparticles-containing hydrogels for treating and/or decontaminating a fluid such as water or air.

BACKGROUND OF THE INVENTION

Air contamination or pollution is a side effect of industrialization. Further, airborne contaminants in various indoor environments have become a significant concern with regard to health, particularly in places of business, institutional and public buildings and virtually any indoor environment wherein it is desired to eliminate solid particles (dust, pollen, mold, lint, fiber), other particulates, such as tobacco smoke and certain aerosols, and gas phase pollutants, such as formaldehyde, various volatile organic compounds and other odor causing gases. The composition and concentration of such contaminants will, of course, vary depending on the particular environment and the sources which generate various concentrations of the above-mentioned contaminants. People are now aware that polluted air could be a hazard and there is thus a strong demand for efficient and safe air filters, that can be produced at a reasonable price. However, often, efficient filters are expensive.

Water resource contamination, also a side effect of industrialization, is becoming a major global issue with various organic and inorganic contaminants finding their way into the underground and surface waters. Further, the effluent from so-called "dirty industries", such as mining, metallurgy, textile, chemical processing, pharmaceutical, electronics and automotive often contain considerable amount of heavy metal ions, organic solvents, dyestuffs and, most recently, nanomaterials which can pose serious health risks if they come in contact with many living organisms. Hospital wastewaters can also contain significant pharmaceutical compounds. In addition to these, periodically, oil and other chemical spillages occur in marine environments. These catastrophic contaminations often require elaborative and lengthy remediating measures and mostly leave a long-lasting negative impact on the affected region.

There are various techniques for water decontamination, among which adsorption, ion exchange, reverse osmosis, and precipitation have been widely studied. Adsorption of pollutants using a suitable sorbent has been shown to be one of the most versatile, adaptive and cost-effective methods for decontamination of heavy metal ions and organic materials. Adsorption is the transfer of a material from a liquid phase onto a solid surface by formation of a physical or chemical bond with it. A huge effort has been made in the past years to develop materials and structures with high sorption efficiency and relative selectivity for a wide variety of contaminations.

Materials such as silica, alumina, a variety of polymer foams and fibers, activated carbon and carbon black have been used as effective sorbents for removal of organic and inorganic contaminants. Recently, attention has shifted towards novel carbon nanomaterials such as carbon nanotubes (CNT), carbon nanofibers (CNF) and graphene oxide, as candidates for effective sorbent materials and structures thanks to their high specific surface area; however, removal of the sorbents after the decontamination measures from the aquatic environment is often a major obstacle which limits their use as a viable technology. One strategy to overcome this issue is to self-assemble the sorbent nanomaterials into rationally-designed 3D porous structures (sponge-like structures) to benefit from their very high specific surface area and, at the same time, ensure their successful recovery from the aquatic environment.

Graphene-based hydrogels have garnered considerable attention as a new class of porous materials for water and wastewater treatment via molecular adsorption of contaminants. The rational assembly of graphene oxide (GO) nanosheets—the strongest material ever known that possesses the highest theoretical specific surface area—into a 3D porous architecture not only exploits the plethora of active sites available on nanoscale GO, but also immobilizes these nanosheets into a bulk structure. Given the potential health risks and cytotoxicity of nanoparticles, nanosheet immobilization is an essential requirement for water treatment applications, where recovery of suspended nanoparticles from treated water poses an additional challenge to be overcome. There are numerous filtering materials that can be used for filtering both a liquid and a gas, such as activated carbon. Much like activated carbon, graphene-based hydrogels can also be used for filtering a liquid or a gas, exploiting the plethora of active sites available on nanoscale GO.

Graphene-based hydrogels have been processed using a myriad of self-assembly and template directed methods. The resulting hydrogels have been successfully used for adsorption of model pollutants such as dyes, heavy metals, oils, organic compounds and pharmaceuticals. Besides graphene and GO hydrogels, composite GO-based hydrogels have been investigated extensively. A wide variety of polymers, biomolecules and inorganic nanoparticles have been introduced to GO hydrogels to impart multifunctional properties to the resulting nanocomposite hydrogels. Magnetic Fe and $Fe_3O_4$ were added to GO hydrogels to instill magnetic properties, thus making them easily recoverable from aqueous medium after the decontamination process. Hydrogels of GO with chitosan and polydopamine have been processed to achieve superior antimicrobial properties and adsorption capacity towards anionic dyes resulting from the positively charged groups of the polymers. Adding $TiO_2$ nanoparticles to GO hydrogels has been reported as a strategy for simultaneous adsorption and photocatalytic degradation of organic dyes and other macromolecules. However, most of the current reports on nanocomposite hydrogels have been focused on optimizing their adsorption capacity towards various contaminants and the mechanical performance and reusability of hydrogels have been mostly neglected.

Due to the extremely high aspect ratio (more than 10,000), GO nanosheets self-assemble into 3D hydrogel structures when their concentration exceeds ~2 mg/mL. The critical concentration for gelation is governed by various parameters, including medium pH, lateral size of the nanosheets and their degree of oxidation. Although GO is one of the strongest materials ever known, the mechanical properties of GO hydrogels are critically influenced by the bonding strength between GO nanosheets. The nature of these inter-sheet bonds is a matter of dispute in the literature and there is no consensus on whether GO sheets link together through chemical or physical bonds; however, it is apparent that these bonds are far less strong than the covalent bonds between the constituent elements of GO sheets. As a result, the reported storage moduli of GO hydrogels are within 0.1-80 kPa range, as measured by rheometry or dynamic mechanical analysis (DMA) at 10 Hz. The storage moduli of pristine GO hydrogels are often below 1 kPa, whereas nanocomposite hydrogels reinforced with polymers or other nanoparticles are reported to have higher storage moduli of up to 80 kPa. However, even when reinforced with both carbon nanotubes (CNTs) and α-FeOOH nanorods, the elastic modulus of the reported ternary nanocomposites did not surpass 300 kPa.

Use of 1D nanomaterials such as CNTs in conjunction with 2D GO has been shown to result in improvement of various properties of hydrogels such as specific capacitance, adsorption capacity, electrical conductivity and mechanical properties. GO sheets are metastable and tend to revert back to a layered structure once they are destabilized in aqueous medium. A good example of self-assembly of GO sheets into layered structures can be evidenced in aqueous processed paper-like GO and polymer-GO nanocomposites. Introduction of 1D CNTs provides a geometrical barrier where face-to-face assembly of GO nanosheets is remarkably hindered. For GO hydrogels, this geometrical barrier translates into improved porosity and stronger hydrogels; CNTs act as a scaffold to hold GO nanosheets in place and improve their mechanical integrity. However, given the proven health risks of CNTs, use of this nanomaterial for water treatment applications is not a viable option; hence, there is a need for an alternative green 1D nanomaterial for hybridization of GO hydrogels.

Cellulose nanocrystals (CNCs) are 1D crystalline nanorods that are isolated from semi-crystalline cellulose, the most abundant natural polymer, through selective dissolution of the amorphous segments of cellulose fibers. Unlike CNTs, there have not been any major reports on the health risks and cytotoxicity of CNCs. Moreover, the mechanical properties of CNCs are comparable with Kevlar fibers and on par with CNTs. Similar to GO, the surface of CNCs is decorated with a myriad of carboxyl and hydroxyl groups which renders them hydrophilic and highly dispersible in water. This unique property of CNCs is in contrast with the hydrophobic nature of pristine CNTs, which hinders their processing in aqueous medium; use of surfactants, extended sonication and/or costly and time-consuming surface functionalization is often necessary to obtain well-dispersed GO-CNT hybrids.

However, forming such 3D porous structures or scaffolds introduces new limitations and issues, as in many instances they require dangerous and/or toxic materials as well as high energy demand. In other instances, the materials require complex manufacturing equipment limiting their scale up and cost. Still in some instances, the structure is so friable that it leaches into the wastewater to be decontaminated, requiring a further step of removing the filtering material that leached from the structure into the media. Accordingly, it would be beneficial to provide a low cost synthesis methodology exploiting self-assembly of porous structures with low complexity, low energy requirements, and environmentally compatible materials. It would also be beneficial in a further aspect if the porous structures would be stable enough not to leach into the media to be decontaminated.

SUMMARY OF THE INVENTION

It is an object of the present invention to mitigate limitations in the prior art relating to fluid filtration such as air and water filtration and more particularly the exploitation of nanocrystals, conjugated nanocrystals, and nanofibers.

In accordance with an embodiment of the invention there is provided a method for preparing a graphene oxide (GO) hydrogel. The method comprises the steps of:

a) adding vitamin C (VC) to a dispersion GO in a ratio GO:VC varying from 1:50 to 1:300; and b) incubating at a temperature above 45° C. the dispersion of a) for a time sufficient for a porous hydrogel to be self-assembled from the dispersion.

In a preferred embodiment, the temperature is from 80° C. to 95° C., and most preferably of 95° C.

In a still preferred embodiment, the ratio is from 1:150 to 1:200, and preferably 1:150.

In accordance with a further embodiment of the invention, there is provided a hydrogel prepared by the method described herein.

Still in accordance with a further embodiment of the invention, there is provided a method for preparing a hybrid hydrogel. The method comprises the steps of:

a) adding in a suspension graphene oxide (GO) to cellulose nano-particles (CNPs) in a ratio GO:CNPs from 4:1 to 1:1;

b) adding to the suspension of a) vitamin C (VC) in a ratio GO:VC varying from 1:50 to 1:300; and c) incubating at a temperature above 45° C. the dispersion of a) for a time sufficient for a porous hydrogel to be self-assembled from the dispersion.

In a preferred embodiment, the temperature is from 80° C. to 95° C., and most preferably of 95° C.

In a still preferred embodiment, the ratio is from 1:150 to 1:200, and preferably 1:150.

In a preferred embodiment, the ratio GO:CNPs is 2:1.

Further in accordance with an embodiment of the invention, there is also provided a hybrid hydrogel prepared by the method as described herein.

Still in accordance with another embodiment of the invention, there is provided a porous self-assembling hydrogel comprising graphene oxide (GO) and cellulose nano-particles (CNPs) in a ratio GO:CNPs from 4:1 to 1:1, and preferably of 2:1.

In accordance with the present invention and the various embodiments described herein, there is provided for the use of the hydrogel or the hybrid hydrogel for removing contaminants, such as for example organic contaminants, heavy metal contaminants and microorganisms, from a fluid. The fluid can be a gas or a liquid medium. Hence the present invention also provides for a method for removing contaminants from a fluid such as a liquid medium, gas or air. The hydrogel or hybrid hydrogel can also be used as a filter for removing contaminants.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 22A illustrates the adsorption of target contaminants from single component or complex water matrices consisting of MB, TC, $Cu^{2+}$ ions and humic acid, each at a concentration of 15 mg/L;

FIG. 22B illustrates the re-usability of the GO:CNC 2:1 hydrogel for adsorbing MB;

FIG. 22C illustrates a kinetic comparison of MB adsorption by GO:CNC 2:1 hydrogel vs. BRITA™ and NORIT™ granular activated carbon;

DETAILED DESCRIPTION

Figure 1:
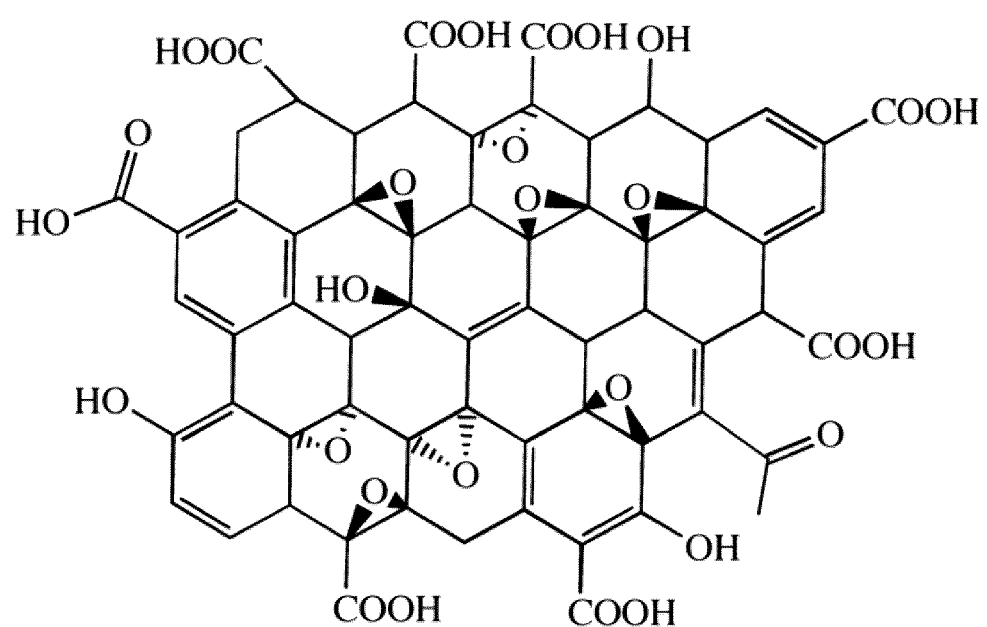
FIG. 1 depicts schematically the molecular structure of graphene oxide.

The present invention is directed to a hydrogel and its use for water and air treatment. In one embodiment, there is provided the use of GO hydrogels made in the presence of excess of Vitamin C. Still in a further embodiment, there is provided the use of the GO hydrogels comprising cellulose nanocrystals (CNCs) or cellulose nanofibers (CNFs).

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "filter" or "filters" as used herein and throughout this disclosure refers to a sorbent used to absorb or adsorb one of chemicals from a fluid or a device.

A "scaffold" or "scaffolds" as used herein and throughout this disclosure, refers to a structure that is used to hold up, interface with, and/or support another material.

A "nanoparticle" as used herein refers to, but is not limited to, a structure having one or more dimensions at the nanometer level, which is typically between the lower and upper dimensions of 0.1 nm and 100 nm. Such structures may include, but are not limited to, nanofilaments having one dimension on the nanoscale, nanotubes having two dimensions on the nanoscale, and nanostructures having three dimensions on the nanoscale. Nanotubes may include structures having geometries resembling, but not be limited to, tubes, solid rods, whiskers, and rhomboids with square, rectangular, circular, elliptical, and polygonal cross-sections perpendicular to an axis of the nanotube. Nanostructures may include structures having geometries representing, but not limited to, spheres, pyramids, and cubes. The cross-sectional geometry of nanotubes and nanoparticles may not be constant such that a nanostructure may taper in one or two dimensions.

"Cellulose nano-particle" or CNP as referred to herein is meant to refer to cellulose nanocrystals and/or cellulose nanofibers.

Graphene oxide has been shown in the art to be functionalized. Its structure being well characterized, it can be functionalized to add functional groups that may be useful for conducting a specific task or to provide specific characteristic to the hydrogel. As an example, electric conductivity may be desired to remove some contaminants. Such electric conductivity of the hydrogel may be enhanced with the use of specifically charged groups that can be used to functionalize the graphene oxide. As further example, GO can be further functionalized with the attachment on its reactive groups of antimicrobial compounds. Such functionalized graphene oxide is also encompassed in the present invention. Graphene oxide as being used herein refers regardless to both graphene oxide and functionalized graphene oxide.

Within the ensuing description an exemplary embodiment of the invention exploiting ascorbic acid as a gelling and cross-linking material for forming a scaffold within which nanoparticles are dispersed is described. It would be evident that other materials may be employed to form porous and/or solid scaffolds for use in association with the nanoparticles.

An overall goal of the inventors has been to establish a new filtering material and a new methodology for decontaminating water, wastewater, air, and other fluids using such new filtering material. Preferably the new filtering material should be manufactured with a manufacturing process that was low cost, low complexity, and low energy allowing it to be implemented at both large scale commercial levels but also small scale community/residential levels. Further, in addition to supporting up-line and point-of-use applications it should be reusable and address not only today's pollutants, inorganic and organic, but also emerging contaminants such as pharmaceuticals and personal care products. Further, it should also preferably be able to remove microorganisms and biological material.

In one embodiment, there is provided GO hydrogels with superior mechanical properties and high adsorption efficiency towards a wide range of water contaminants.

In another embodiment, there is provided GO-CNC or GO-CNF hybrid hydrogels with superior mechanical properties and high adsorption efficiency towards a wide range of water contaminants.

Example 1

Graphene Oxide

Graphene oxide (GO) is essentially a graphene sheet with functional groups dispersed throughout its molecular structure. Referring to FIG. 1, there is depicted schematically GO showing carboxyl groups being distributed across, hydroxyl groups and epoxide groups which serve as good sites for pollutants to potentially attach. GO is a single atom thick layer of graphite formed by latticed carbon atoms with both hydrophilic and hydrophobic properties which can be easily functionalized. Similarly, graphene has these benefits and they both offer very large theoretical specific surface areas. However, an issue with GO, and graphene, is that it is a nanomaterial and at this point in time relatively little is known about its toxicity and larger environmental effects. Further, the removal of nanomaterials from treated fluids such as water is difficult and energy intensive.

In order to address these issues, graphene and/or GO can be conjugated into larger macrostructures where the objective is to exploit the properties of graphene or graphene oxide as functional building blocks within a larger framework or scaffolding provided by other building blocks thereby creating a bottom up nanotechnology. A three-dimensional (3D) network offers the benefit of preventing the graphene and/or GO aggregating whilst also providing a larger physical 3D structure which offsets the main disadvantages of exploiting nanoparticles (NPs) in environmental applications. However, new limitations in forming such a 3D structure arise where many forming methods include dangerous and toxic materials, complex manufacturing, and high energy demand, which drive up the cost. An example of this is hydrazine, which is toxic, unstable, and hydrothermal treatment requiring high energy as well as requiring sophisticated processing steps. Accordingly, the inventors have sought and established a novel graphene and/or GO macrostructure exploiting hydrogels which provide an environmentally-compatible, low cost, simple technology manufacturing methodology which addresses the delicate balances between mechanical stability, chemical reduction and adsorptive performance. Embodiments of the invention exploit self-assembling porous hydrogels with environmentally compatible (friendly) gelation agents and low temperature processing.

Processing of GO

Briefly, GO was processed using a modified Hummers method as described in Yousefi, et al. (Carbon 2013, 59, 406-417). Graphite (natural graphite, Ausbury Mills) was thermally expanded at 1050° C. for 15 s. 0.5 g of the resulting expanded graphite was mixed with 100 mL sulfuric acid (Fisher) in a round bottom flask. 5 g of $KMnO_4$ (Sigma-Aldrich) was then slowly added to the flask and the mixture was stirred at 200 rpm for 24 h in a 45° C. water bath. The reaction flask was subsequently transferred into an ice bath and 125 mL of a 4:1 mixture of deionized (DI) water:$H_2O_2$ (Fisher) was added in a drop-wise manner to the flask mixture. After stirring for 30 min, the light brown reaction mixture was washed through successive centrifugation using 10% HCl (Fisher) solution and deionized (DI) water at a maximum 18,000 g. Each wash consisted of decantation of the supernatant and re-suspension of the resulting pellet in HCl or DI water. A total of 3 HCl and 5 DI water wash cycles were performed. The final concentration of the GO dispersion was 4 mg/mL.

The inventors exploit a sol-gel manufacturing methodology in order to achieve the targets of low complexity, low cost, low temperature, and low energy as well as a manufacturing methodology that supports implementation across a wide cross-section of the world's users of filtered water.

The synthesis method and GO hydrogels (that may be useful as filters) within the following descriptions of embodiments of the invention use ascorbic acid (commonly known as vitamin C but strictly a vitamer of vitamin C, $C_6H_8O_6$, referred herein as vitamin C, VC, VitC or VitaC). Production of GO hydrogels has been shown in the art, for example in Zhang et al. (Chemical Communications, 2010, 46, 1112-1114). However, synthesis of GO hydrogels in the presence of excess VC has never been made before. As will be demonstrated hereinafter, such excess VC confers improved mechanical properties to the hydrogels.

Preparation of GO Hydrogels

Hereinafter is an example of a preparation of a hydrogel. However, amounts of GO or VC can be varied as long as the ratios indicated herein are respected. As an example, in glass vials, 40 mg of GO was added to 6 g of VC to achieve a GO:VC ratio of 1:150 and was vigorously mixed through at least 5 min vortexing and 5 min bath sonication. The glass vials were transferred to a water bath at 95° C. After either 2, 5 and 10 minutes of residing in the water bath, the vials were further vortexed to ensure complete dissolution of VC and homogeneous dispersion of the hydrogel components. The vials were then left undisturbed in the water bath for 50 min. The dispersions self-assembled into porous hydrogels at the end of the heat treatment. The hydrogels were washed with sufficient amounts of deionized (DI) water to ensure complete removal of unreacted species. The samples were designated as GO:VC 1:150. Additional hydrogels were prepared in rations of GO:VC from 1:1 to 1:300. These samples were designated as GO:VC z, where z denotes the 1:z ratio of GO:VC. Kinetics and adsorption capacities of these samples were monitored.

As apparent from Table 1, the VC150 GO hydrogel performs at the high end of absorption capacity.

TABLE 1

Performance of Representative GO:VitaC Hydrogel-NP Samples According to Embodiments of the Invention relative to the Prior Art for MB Contamination

| Material | Adsorption Capacity (mg/g) |
|---|---|
| PRIOR ART | |
| Reduced GO-based hydrogel | 7.85 |
| Cylindrical graphene-CNT hybrid | 81.97 |
| GO aerogel | 96-125 |
| Ni-doped graphene/carbon cryogel | 151 |
| Graphene sponge | 184 |
| EMBODIMENT OF THE INVENTION | |
| GO:VC 150 | 850 |

Figure 2:
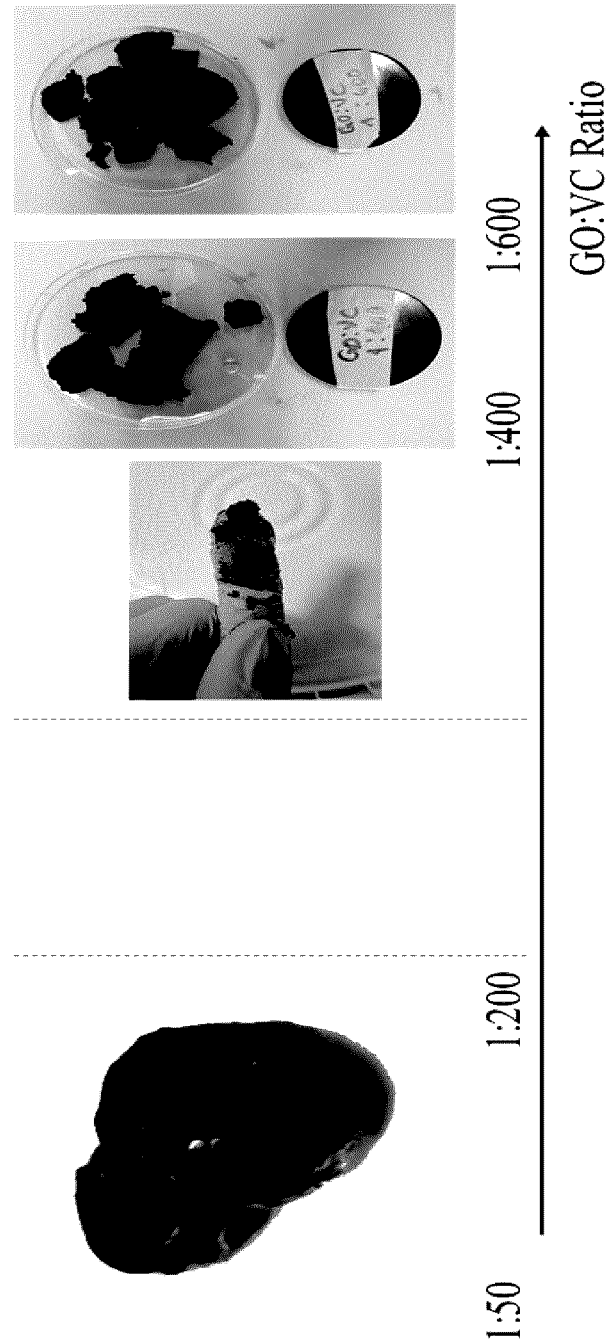
FIG. 2 depicts the breakdown of graphene-oxide hydrogels according to embodiments of the invention at higher ratios of ascorbic acid to graphene-oxide.

The inventors investigated expanding the VitaC framework with GO active nanoparticles to higher ratios, e.g. 1:400 and 1:600, but, as apparent in FIG. 2, the structure of the hydrogel (without CNCs) loses its resistance with increasing VitaC, and began to collapse at ratios of 1:400 and a paste-like product was generated at ratios of 1:600. Additionally, the unreacted VitaC was increasingly difficult to "dissolve out". Further, 1:400 and 1:600 hydrogels were not structurally sound.

Rheometry, SEM and X-ray tomography Accordingly, rheometry tests were performed on various samples (see Table 2) in order to determine the dynamic storage modulus of the VitaC frameworks with GO active nanoparticles.

TABLE 2

Rheometry Performance of Representative GO:VitaC Hydrogel-NP Samples According to Embodiments of the Invention relative to the Prior Art

| Material | Modulus @ 10 Hz (kPa) | Measurement Method |
|---|---|---|
| PRIOR ART | | |
| GO | 1.5 | rheometry |
| GO/Polyacrilamide | 6.5 | rheometry |
| GO/hyaluronic acid | 1.8 | rheometry |
| GO/Alginate/PAM | 30 | rheometry |
| GO | 0.3 | rheometry |
| GO/SDC | 40 | rheometry |
| EMBODIMENT OF THE INVENTION | | |
| GO:VC 100 | 200 | rheometry |
| CONTROL | | |
| VC (Hydrothermal control) | 108 | rheometry |

Table 2 below outlines the measured modulus of embodiments of the invention relative to prior art frameworks.

Figure 3:
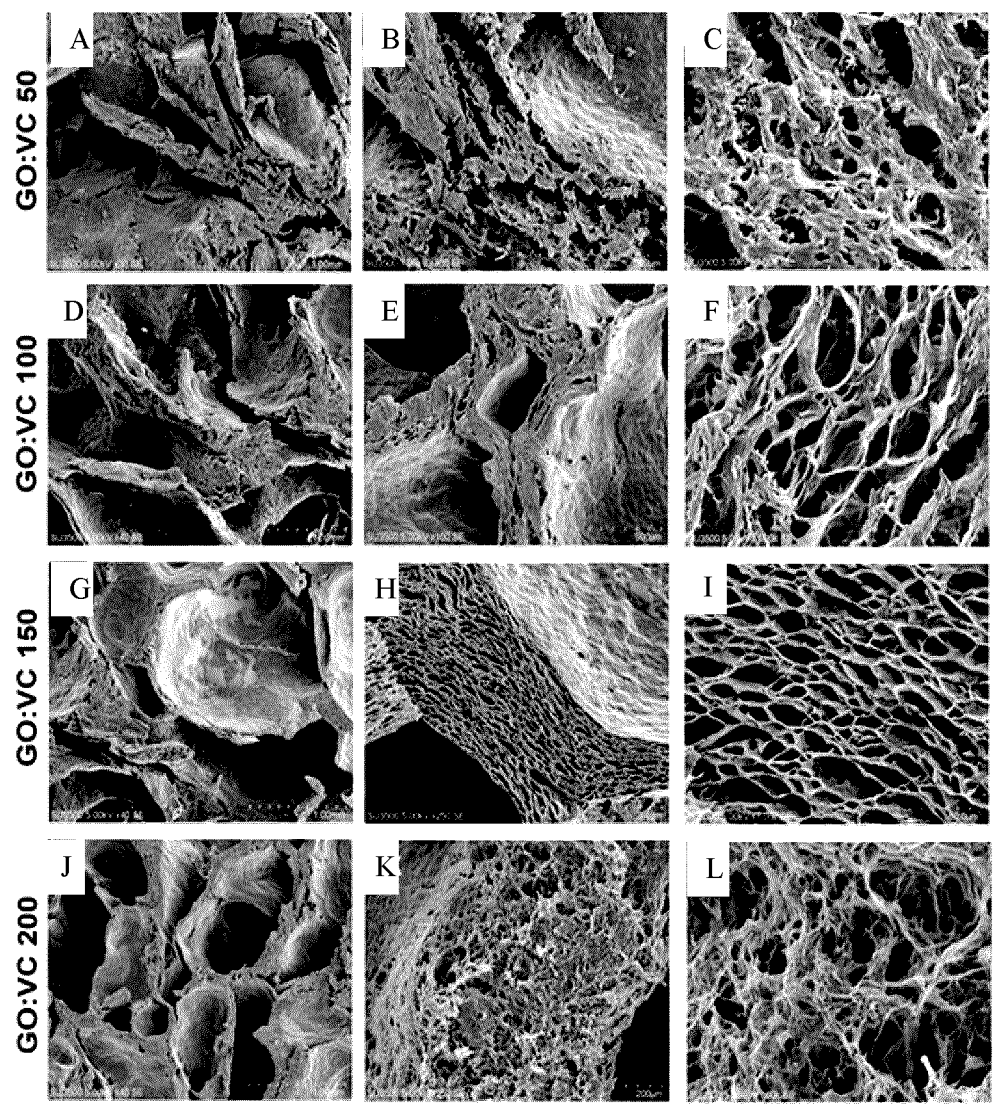
FIGS. 3*a* to 3*l* illustrate SEM micrographs of the freeze-fractured surfaces of (3*a*-3*c*) GO:VC 50, (3*d*-3*f*) GO:VC 100, (3*g*-3*i*) GO:VC 150 and (3*j*-3*l*) GO:VC 200 hydrogels.

SEM imagery was further performed to further characterize the pore structure of the made hydrogels. Although adding excess VC did not affect the surface chemistry of hydrogels, it significantly influenced their morphology (FIGS. 3a to 3l). SEM micrographs of the freeze-fractured surfaces of GO:VC hydrogels (FIGS. 3a to 3l) showed arrays of multi-scale and hierarchical pores in the hydrogels. The hydrogels were comprised of large pores of hundreds of microns to one millimeter in diameter (milli-pores; FIGS. 3a, d, g and j), while their separating walls consisted of submicron to few micrometer wide pores (micron-pores; FIGS. 3c, f, i and l). As can be seen, the porosity is increasing from the 1:50 ratio up to the 1:200 ratio. VitaC has thus an effect on the expansion of the hydrogel and can potentially explain the decrease in mechanical stability as more VitaC is added. The flat sheet-like structures of lower ratios can better withstand applied stresses while the porous structures of higher ratios are more susceptible to deformation.

The hierarchical nature of the pores in hydrogels is due to the use of excess VC; the milli-pores were formed due to dissolution of VC grains. The VC grains act as soft templates for formation of milli-pores as VC is washed out of the pores. During formation of the hydrogel, the excess VC could not be dissolved in the aqueous phase given the small amount of water in 4 mg/mL GO and the relatively high viscosity of concentrated GO dispersions. The remaining granular VC acted as a soft template for the self-assembly of GO sheets at the liquid (water)/solid (VC) interface, resulting in full wrapping of VC grains with GO sheets. The VC grains' soft templates were then dissolved during the post-synthesis washing of the hydrogels with copious amounts of deionized water, leaving large pores (milli-pores) behind. The VC grains were then dissolved during the post-synthesis washing of the hydrogels with copious amounts of DI water, leaving large pores (milli-pores) behind. Interestingly, traces of remnant VC can be seen in some of the images (white patches in FIGS. 3g and 3h) which are in agreement with the XPS and TGA observations. Increasing the VC content influenced the morphology of both milli- and micron-pores; the milli-pore size transformation can be clearly seen in FIGS. 3a, 3d, 3g, and 3j. The micron-pore morphology is equally influenced by the VC content. The wall micron-pores of the GO:VC 50 hydrogel are randomly shaped and lack clear interconnectivity (FIG. 3c), while in GO:VC 100, these pores start to assemble into a honeycomb-like structure (FIG. 3f). The morphology of micron-pores in GO:VC 150 is very close to a honeycomb structure where a high density of well-packed and equi-sized pores is observed. Further increasing the VC content in GO:VC 200 resulted in high density of small interconnected circular pores which did not have the order and structure of GO:VC 150.

The 3D pore structure of the hydrogels was characterized by X-ray tomography. To this end, GO:VC 150 and GO:CNC 2:1 hydrogels were imaged at the Imaging Industry Portal at the Technical University of Denmark using an X-ray microtomography (microCT, Zeiss Xradia VersaXRM-410) instrument. The X-ray source was operated with an accelerating voltage of 40 kV, and the Bremsstrahlung spectrum from the W anode was utilized without additional filters. While rotating the samples 360°, 4001 projections were recorded with an exposure time of 15 s for each projection. The projections were recorded using the large field-of-view detector in unbinned mode, i.e. 2048 by 2048 pixels with an effective pixel size of 10.79 µm. The data were reconstructed using the instrument's built-in implementation of filtered back projection. Subsequently, the obtained data sets were noise-filtered using an iterative implementation of a 3D non-local means algorithm (Bruns, et al., Anal. Chem., 2010, 82, 6569-6575; and Bruns, et al., 2017, under review). The segmentation was done by a custom-made Python script doing simple thresholding followed by removal of small misclassified (isolated) regions. The code used Fabio for reading and writing images (Knudsen, et al., *J. Appl. Crystallogr.*, 2013, 46, 537-539). The largest region spanning the bulk material was selected for both data sets. For GO:VC 150 hydrogel, the final 3D image was 1360×1360×549 voxels (14.9×14.9×5.9 mm) and for GO:CNC 2:1 it was 1360×1360×500 voxels (14.9×14.9×5.4 mm).

For nanotomography, the measurements were performed using the full field hard X-ray microscope (nanoCT, SPring-8 beamline BL37XU, Japan) providing an effective pixel size of 48.4 nm (Suzuki, et al., In Recent progress of hard x-ray imaging microscopy and microtomography at BL37XU of SPring-8, AIP Conference Proceedings, AIP Publishing: 2016; p 020013). Small portions of GO:VC 150 and GO:CNC 2:1 hydrogel were cut from the freeze dried samples with a scalpel and mounted in vacuum grease on a brass pin. All data sets were collected by rotating the samples 180° while recording 1,800 projections with an exposure time of 250 ms. The projection data were dark current and bright field corrected. The truncated sinograms (since the field of view was smaller than the sample dimensions) were completed (Chityala, et al., In Artifact reduction in truncated CT using sinogram completion, Medical Imaging, International Society for Optics and Photonics: 2005; pp 2110-2117) and stripes were removed for ring artifact reduction (Munch, et al., *Opt. Express*, 2009, 17, 8567-8591) before reconstructing the 3D volume using the GridRec algorithm implemented in TomoPy (Giirsoy, et al., *J. Synchrotron Radiat.*, 2014, 21, 1188-1193). Image noise was reduced using the 3D iterative non-local means method (Bruns et al., 2010 and 2017, supra). The resulting images were cropped to volumes of 1020×1020×1004 voxels (49.4× 49.4×48.6 µm) and segmented by marker-based watershed segmentation. Seed locations for the segmentation were chosen by manually selecting two uniform thresholds for all datasets that mark certain background and foreground phases.

A morphological description of the samples was achieved by calculating chord length distribution functions for 106 randomly orientated chords in the void space as well as in the material phase of the segmented 3D images (Bruns et al, 2010, supra; and Courtois, et al., *Anal. Chem.*, 2007, 79, 335-34427). The mean (average) and the mode of the resulting distribution functions are provided as a measure of scale for the hydrogels. The mode of the distribution functions was determined from a continuous density function after applying a kernel density estimate by using the inter-quartile range as a bandwidth selector and an Epanechnikov window.

GO Hydrogel Characteristics

Figure 4:
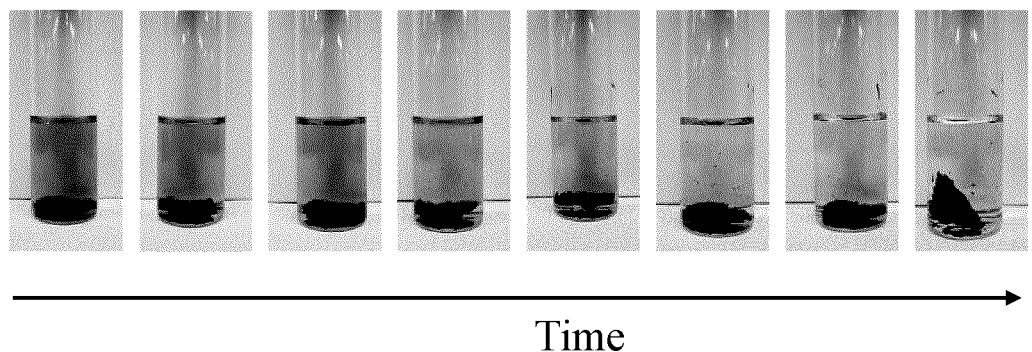
FIG. 4 depicts through a sequence of images methylene blue (MB) adsorption over time with a graphene-oxide hydrogel according to an embodiment of the invention.

Methylene blue (MB, formally C.I. 52015) is a heterocyclic aromatic chemical compound, $C_{16}H_{18}N_3SCl$, with many uses in a range of different fields, including biology and chemistry. Amongst these is its use as a model contaminant because of its ease of detection visually and spectrophotometrically. Referring to FIG. 4, there are depicted images of an exemplary model contamination test using the GO hydrogel produced in excess of VC (GO:VC 1:150), wherein the embodiment of the invention is at the bottom of a container filled with MB and water. As apparent with the subsequent images over a period of time of approximately 2 hours, the water is lighter and lighter as the hydrogel removes the MB contamination.

Figure 5:
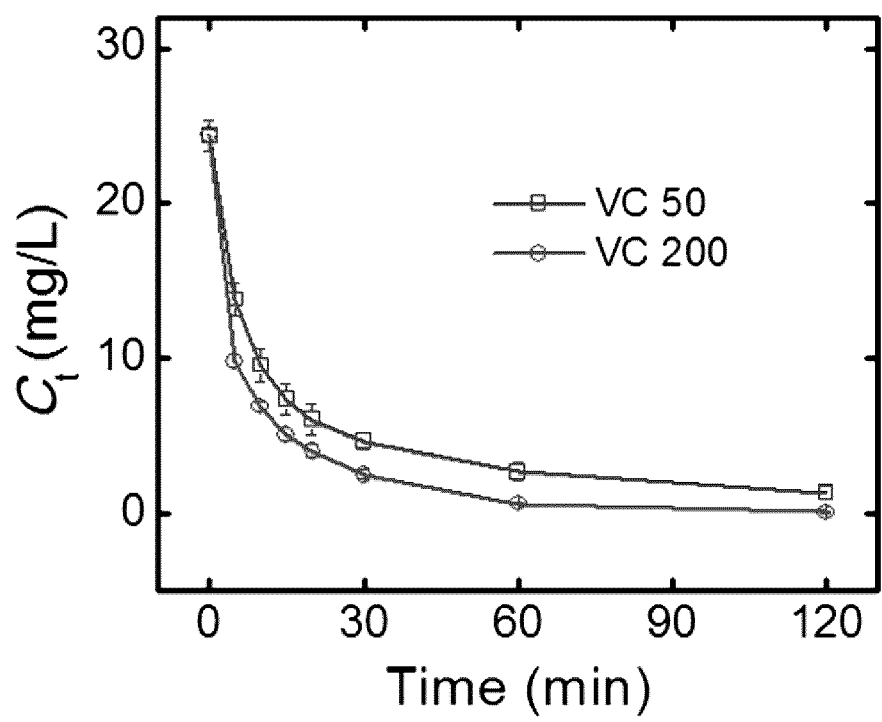
FIG. 5 depicts methylene blue (MB) adsorption over time with GO hydrogels of the present invention, prepared at two different concentrations of VC.

As apparent from FIG. 4, the kinetics showed favorable uptake of MB over a short period of time. Initial solutions at 25 ppm dropped to undetectable levels within 2 hours as illustrated in FIG. 5, wherein results for VC50 (1:50) and VC200 (1:200) are presented. Results for 1:100 and 1:150 intermediate samples are not depicted for clarity but a clear trend is apparent, especially in the earlier time points. Essentially, with increasing VitaC the GO:VitaC Hydrogel demonstrated higher contaminant absorption rate which is manifested as a steeper slope. As more VitaC is added to the mixture, the hydrogel appears to perform better (i.e. faster decontamination). These faster kinetics may be explained by the fact that the additional VitaC provided more expansion in the hydrogels (which was visibly apparent), which suggest a larger pore structure. This may allow the MB to attach to functional groups within the hydrogel more readily.

Figure 6:
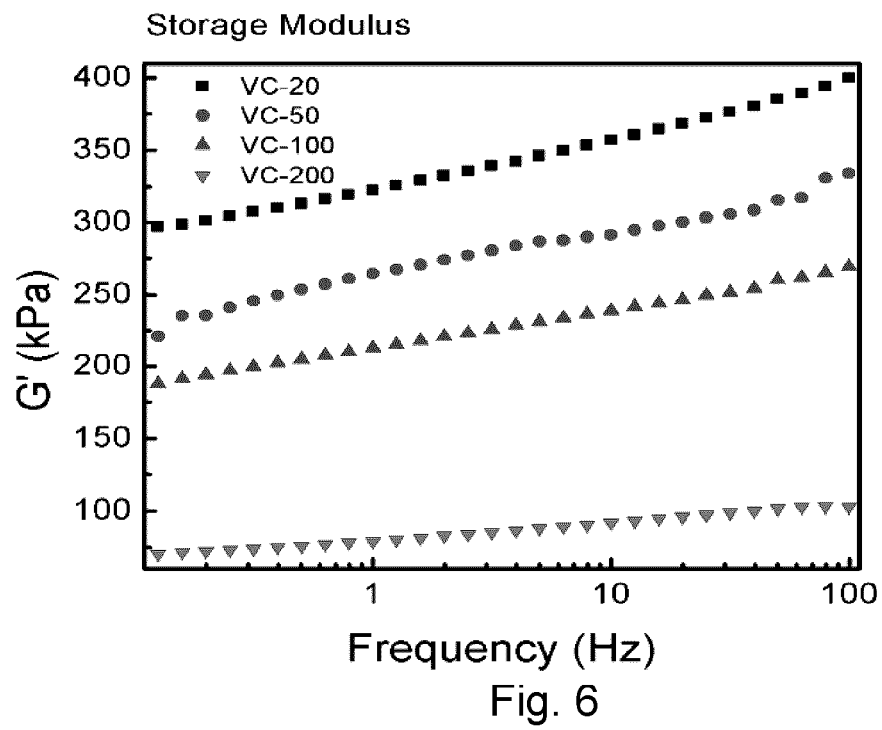
FIG. 6 depicts the results of rheological testing on graphene-oxide hydrogels according to embodiments of the invention.

As apparent from FIGS. 2 and 6, there is a clear trade off in the treatment application as adding more VitaC leads to increasing adsorption rate owing to the increased porosity but the mechanical stability drops. Accordingly, in the experiments presented below, the inventors chose a ratio of 1:150 (VC150) for subsequent adsorption testing, although it also works with other ratios as described herein.

Figure 7:
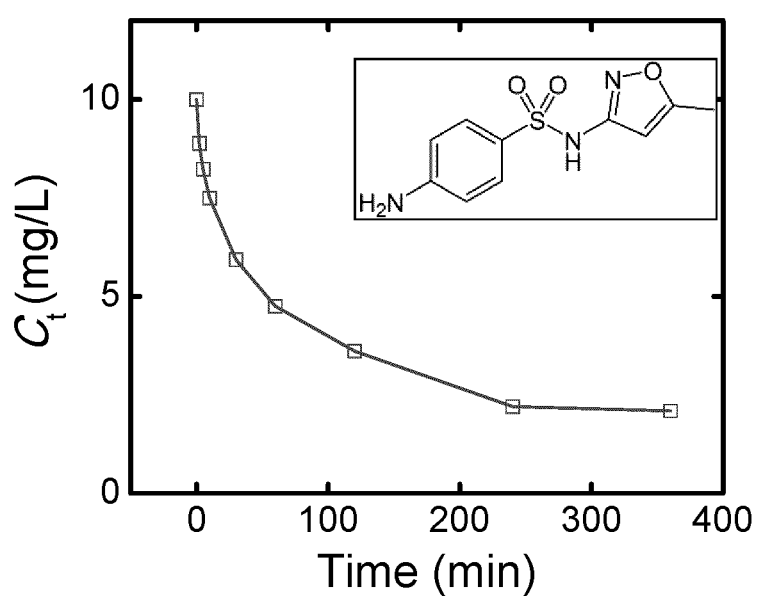
FIGS. 7 and 8 depict the absorption of sulfamethoxazole (SMX) and diclofenac (DCF) by a graphene-oxide hydrogel according to embodiments of the invention.
Figure 8:
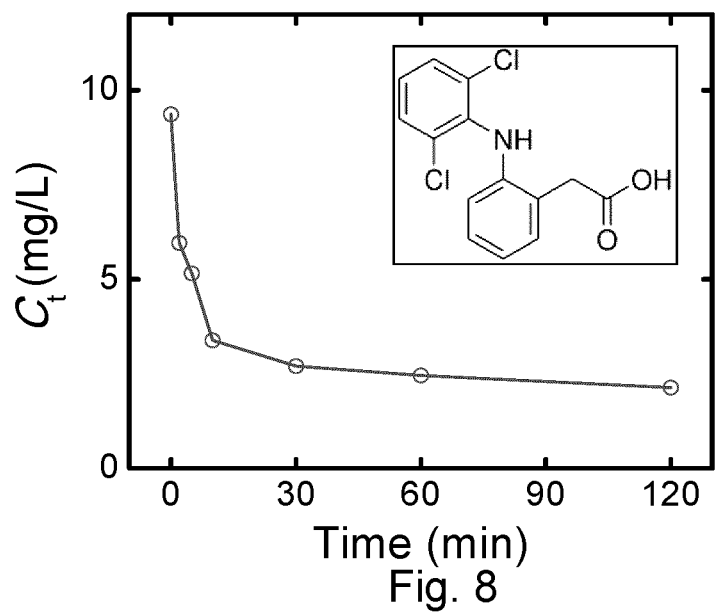

Emerging contaminants are products that are becoming more prevalent in natural waters because of the increased pressures of personal use and industrial scale processes. Some examples are antibiotics, hormones and personal care products. In order to test embodiments of the invention, water was spiked with sulfamethoxazole (SMX), an antibiotic, and diclofenac (DCF), a non-steroidal anti-inflammatory. FIGS. 7 and 8 depict the resulting reduction in concentrations of these chemicals as a function of time. In each case, a noticeable decrease in concentration can be seen over time with a sharp decrease in concentration within the first 2 hours and a gradual decrease to undetectable levels at equilibrium. There is a general gap in prior art as to the ability of 3D hydrogels to uptake these emerging contaminants but we have shown that it is indeed possible to use hydrogels in this process. It should also be noted that the initial concentrations of these solutions was well above environmentally relevant levels in order to determine the kinetics. In each instance, high performance liquid chromatography (HPLC) was used for detection.

Heavy Metal Contamination

Figure 9:
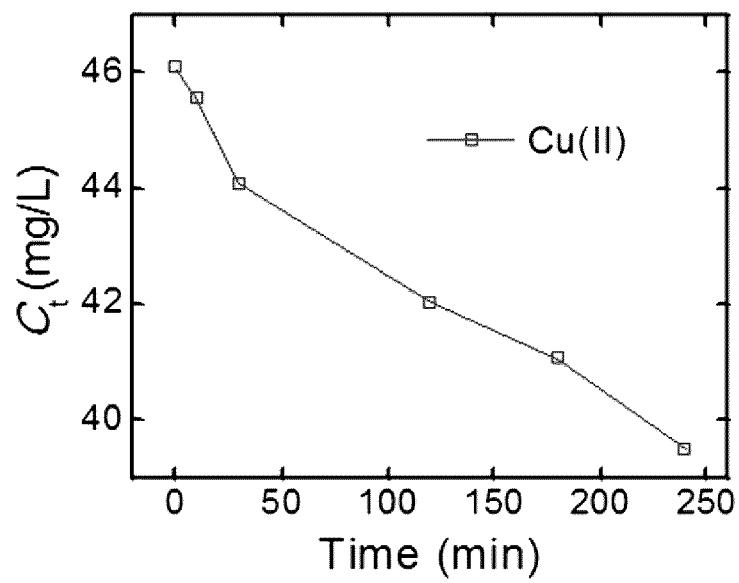
FIG. 9 depicts the absorption of copper by a graphene-oxide hydrogel according to embodiments of the invention.

Heavy metal contamination is another emerging issue in our increasingly developing societies. With the production of more and more heavy metals for a variety of products, the pressures are not reducing. Referring to FIG. 9 there is depicted the adsorption of copper ions, $Cu^{2+}$(CuII). The maximum adsorption at equilibrium for copper was found to be 26.6 mg/g for pH=4.5. The pH is important, especially for metal ion uptake and further measurements required to determine the effect of pH in this process.

Adsorption of Target Contaminants in a Complex Matrix

Figure 10:
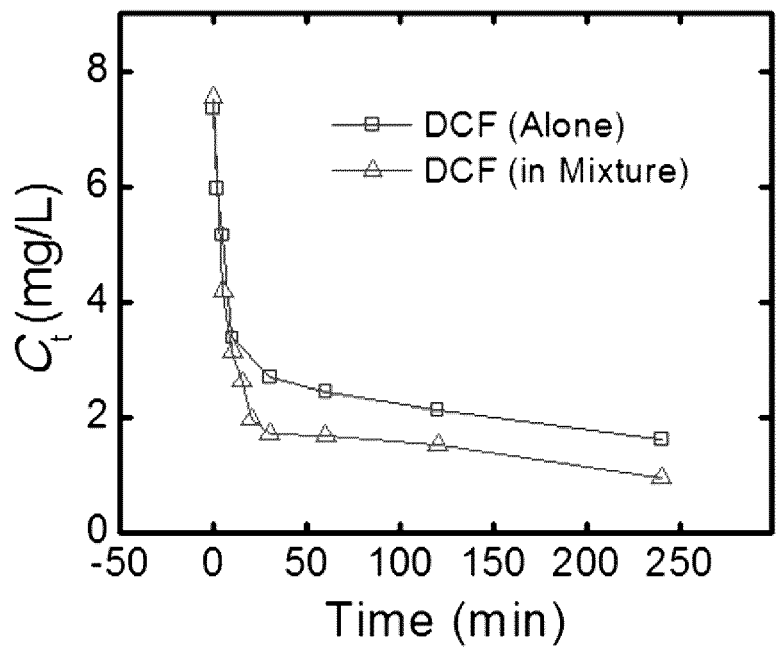
FIGS. 10 and 11 depict the absorption of target contaminants within a complex matrix by a graphene-oxide hydrogel according to embodiments of the invention.
Figure 11:
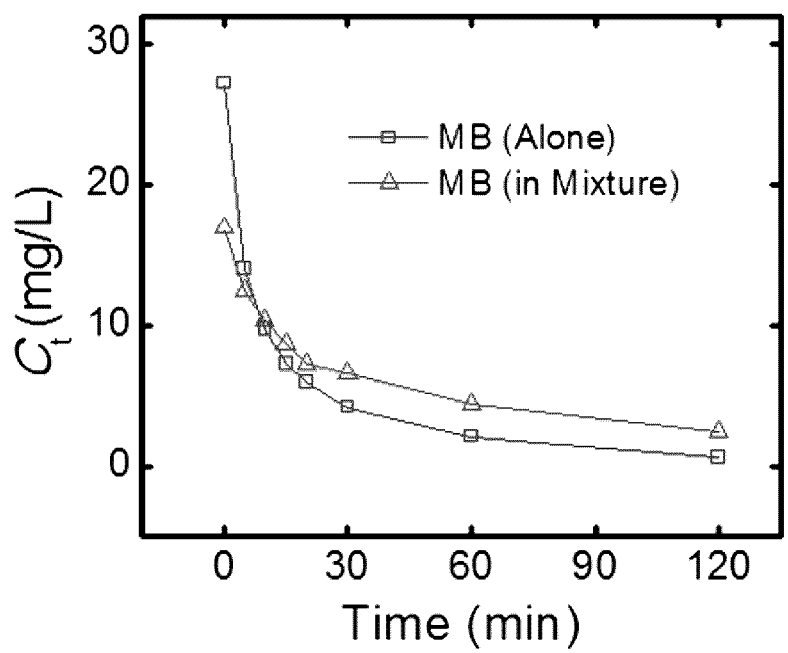

Another challenge in wastewater treatment is the diversity of contaminants that need to be removed, particularly their concurrency. In order to assess this, a complex matrix of MB, DCF and humic acid was generated in order to study the competitive adsorption that might occur with this type of application (i.e. batch studies). Humic acid was chosen as part of the matrix because of its prevalence in natural waters and wastewaters as result of its being a principal component of humic substances, which are the major organic constituents of soil (humus), peat, coal, many upland streams, dystrophic lakes, and ocean water and is produced by biodegradation of dead organic matter. As apparent in FIGS. 10 and 11 relating to DCF and MB respectively, despite the complex make-up of the solution, the DCF and MB continued to show favorable adsorption onto the hydrogels.

Graphene Oxide Sol-Gel Reuse

Figure 12A:
FIGS. 12A to 12D depict reuse of graphene-oxide hydrogels according to embodiments of the invention.
Figure 12B:
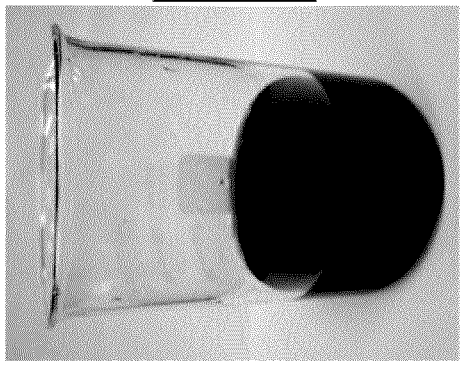
Figure 12B:
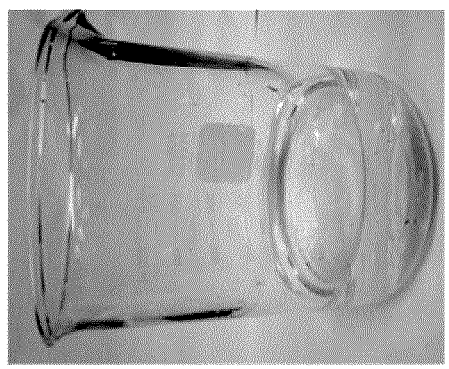
Figure 12C:
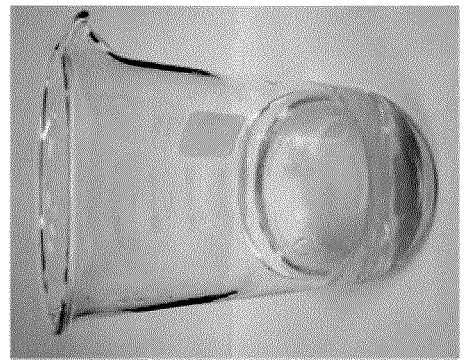
Figure 12D:
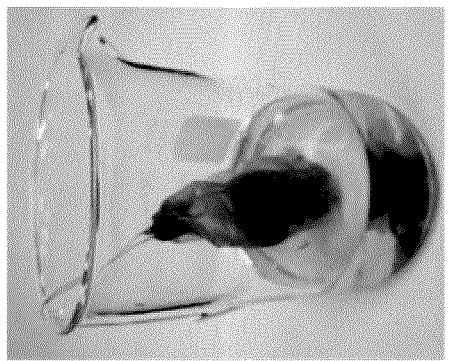

The inventors have also assessed qualitatively in respect of the reuse of their graphene oxide hydrogels. A 200 mL solution of 100 mg/L MB was dosed with a hydrogel according to an embodiment of the invention and brought to equilibrium over a period of 24 hours. The result was a visibly less blue solution, ultra-violet/visible testing placed the final water concentration at approximately 3 mg/L. This step being depicted in FIG. 12A. The hydrogel, housed in a biodegradable paper mesh, was removed and a desorption step was accomplished by mixing in diluted sulfuric acid, see FIG. 12B. After 6 hours of desorption, the hydrogel was removed from the sulfuric acid and mixed in DI water several times to dilute any excess sulfuric acid. The hydrogel was then placed in the same solution that had reached equilibrium, see FIG. 12C, and the result was a complete removal of MB in the solution, see FIG. 12D. This result is the reuse of these hydrogels in water filtering applications. It also shows that the hydrogels are robust and stable even in corrosive environments.

Accordingly, graphene oxide-based hydrogels according to embodiments of the invention employing VitaC as a combined gelling and cross-linking agent have been demonstrated to filter heavy metals (copper), pharmaceuticals (SMX and DCF), and chemicals (MB). It is anticipated that the graphene oxide-based hydrogels according to embodiments of the invention will also filter additional pollutants including cyanotoxins, hormones, bacteria, organic solvents, etc. Additionally, the graphene oxide-based hydrogels according to embodiments of the invention may be further processed and/or functionalized in order to provide, for example, anti-biofouling properties as well as targeting of other pollutants. It would be evident that the hydrogels manufactured according to embodiments of the invention may be combined with and/or manufactured within housings allowing a variety of fluid flow through type systems depending on the particular applications. It would also be evident that the graphene oxide-based hydrogels according to embodiments of the invention may also be combined and/or exploited within other framework configurations such as membranes, for example.

Example 2

Graphene Oxide—Cellulose Nano-Particle Hydrogels

In the preceding section, GO based hydrogels were described exploiting excess VitaC as a combined gelling-cross-linking agent in order to provide a porous, yet mechanically strong material with very high specific surface area and affinity towards common and novel water contaminants. The described processing method is very versatile and can be adapted to prepare hydrogels with any desirable geometry. Furthermore, the processed hydrogels are very light weight. However, they are electrically insulating. In other filtering applications, an electrically conductive filtration framework would be beneficial to provide a practical candidate as a high-efficiency sorbent for large-scale contaminations, such as marine oil spills, with a unique advantage of being re-collected after decontamination by applying a simple electric field. Given the vast scale of marine oil spills, using a cheap, efficient, light and stimulus-responsive material with the possibility of re-collection and reclamation is highly desirable. In addition, several industrial wastewater streams currently utilize treatment systems that can be costly, using sophisticated membrane systems. Accordingly, embodiments of the invention may replace existing systems as a cost-effective and robust alternative.

Processing of CNC

The processing method for isolation of CNCs has been described for example by Hosseinidoust, et al. (Nanoscale 2015, 7, (40), 16647-16657) and by Yang, H. et al. (Cellulose 2013, 20, (4), 1865-1875). In short, 10 g Q-90 softwood pulp was soaked in 250 mL DI water overnight, manually disintegrated by a spatula and reclaimed using a nylon mesh. The softwood pulp was transferred into a beaker and was reacted with 0.093 M $NaIO_4$ (Sigma-Aldrich) and 1M NaCl (Fisher) for 96 hours. Next, 4% ethylene glycol (Sigma-Aldrich) was added to the mixture to stop the periodate reaction and the treated pulp was vigorously washed with DI water to remove unreacted species and ions. The treated pulp—rich in aldehydes at this stage—was resuspended in DI water at a concentration of 20 g/mL. Next, 1 M NaCl, 0.26 M NaClO (Sigma-Aldrich) and 0.26 M $H_2O_2$ (Fisher) was added to the mixture and stirred for 24 hours to convert the aldehydes to carboxyl groups. The pH of the mixture was maintained at 5 using 1M NaOH solution. Finally, CNCs were separated from the mixture by 10 min centrifugation at 26,000 g and redispersed in DI water at a concentration of 20 mg/mL.

The process used herein has low energy requirements, is safe, clean and has a short production time.

Preparation of Hybrid Hydrogels

Metered ratios of GO and cellulose nano-crystals (CNC), GO:CNC 1:2, were mixed with various amounts of ascorbic acid (vitamin C) (VitaC) in order to provide GO:VitaC ratios from 1:50 to 1:200. These were processed as described supra in respect of the non-CNC GO-based hydrogels. The uniform aqueous dispersions of GO, CNC and VitaC self-assembled to form solid and visibly porous hydrogels which floated on the excess water in the containers. The process for preparation of these hydrogels is very fast and does not require any high-pressure vessels. The excess reactants were removed through vigorous rinsing with de-ionized water (DI).

More specifically, 40 mg of GO was mixed with appropriate amounts of CNCs in a glass vial to achieve GO:CNC ratios of 4:1, 2:1, 1:1 and 1:2. Next, 6 g of VC was added to each mixture to achieve a GO:VC ratio of 1:150 and vigorously mixed through at least 5 min vortexing and 5 min bath sonication. The glass vials were transferred to a water bath at 95° C. After 2, 5 and 10 minutes of residing in the water bath, the vials were further vortexed to ensure complete dissolution of VC and homogeneous dispersion of the hydrogel components. The vials were then left undisturbed in the water bath for 50 min. The dispersions self-assembled into porous hydrogels at the end of the heat treatment. The hydrogels were washed with sufficient amounts of DI water to ensure complete removal of unreacted species. The samples were designated as GO:CNC x:y, where x:y denotes the ratio of GO:CNC. For the samples without CNCs, 40 mg GO was mixed with the corresponding amount of VC to obtain GO hydrogels with 1:1 up to 1:300 GO:VC ratios. These samples were designated as GO:VC z, where z denotes the 1:z ratio of GO:VC.

In a nutshell, GO-CNC and GO-CNF hybrid hydrogels were processed using vitamin C (VC), serving as a natural gelling and reducing agent. As the reducing agent, excess amounts of VC were added to mixtures of GO and CNCs or CNFs at mild conditions (95° C. and near ambient pressure) to form hydrogels with hierarchical pore structures. The pores at millimeter, micrometer and sub-micrometer length-scales provided a highly interconnected platform for efficient molecular level adsorption of dissolved contaminants. Use of 1D CNCs or CNFs in conjunction with 2D GO nanosheets had a remarkable synergistic effect on the mechanical properties of the nanocomposite hydrogels. The hybrid hydrogels not only showed superior adsorption capacity towards individual classical and emerging contaminants in water, but also efficiently adsorbed those contaminants in more complex water mixtures. This is the first report of the use of CNCs or CNFs as a reinforcing agent for GO hydrogels using a mild and green processing method—"green" as the gelling and reducing agent is natural, not harmful nor toxic for the environment.

Hydrogel Characterization

Introduction of CNCs resulted in a slight increase in the amount of hydroxyl groups and reduction in the amount of carboxyl and epoxide groups in GO:CNC 2:1 hydrogel versus GO:VC 150. Furthermore, it can be confirmed that adding CNCs did not interfere with the reduction mechanism of VC on GO nanosheets; VC was shown to mostly reduce hydroxyl groups in both GO:VC and GO:CNC samples.

Figures 13A, 13B:
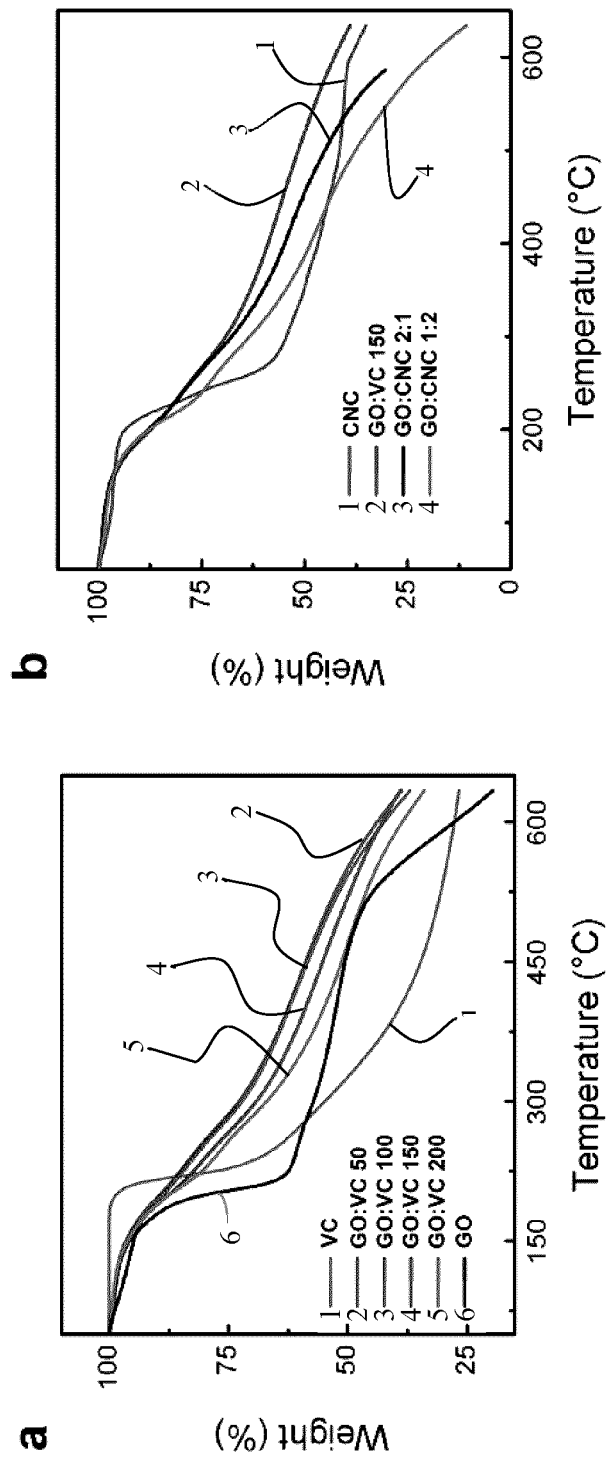
FIGS. 13A and 13B illustrate TGA thermograms of GO:VC (13a) and GO:CNC (13b) hydrogel samples.

Despite the vigorous washing steps taken before drying the hydrogels, the presence of unreacted (excess) VC was confirmed by thermogravimetric analysis (TGA) (FIG. 13A). The weight loss-temperature profiles of the GO:VC samples followed the same trend until the temperature was raised beyond the onset of decomposition of pure VC (205° C.). At this temperature, the curves started to deviate due to the presence of various amounts of unreacted VC in the hydrogels. The excess VC increased with increasing VC content of the GO:VC hydrogels.

Successful incorporation of CNCs into the hybrid hydrogels was also investigated by TGA. Since both CNCs and GO have negatively-charged carboxyl groups, the electrostatic repulsion between them could potentially lead to the leaching of CNCs from the hydrogel structure during the final washing step; however TGA thermograms (FIG. 13b) confirmed that significant amounts of CNCs are immobilized in the hybrid hydrogel structure. The spreading of weight loss profiles of CNC-containing (GO:CNC) hydrogels above the onset of decomposition of pure CNCs (~210° C.), their deviation from the negative control (GO:VC 150) hydrogel and the larger weight loss of the GO:CNC 1:2 hydrogel that contains more CNCs than the GO:CNC 2:1 hydrogel are all testaments to the fact that CNCs were successfully embedded into the hydrogels. Given the carboxyl- and hydroxyl-rich surface of CNCs and the abundance of hydroxyl and carboxyl groups on GO, hydrogen bonding could be a major reason behind the attachment of CNCs onto GO nanosheets in the hybrid hydrogels.

The use of VitaC as an environmentally beneficial crosslinker and naturally obtained cellulose nano-crystals (CNCs) or cellulose nano-fibers (CNFs) is an advantage over alternative materials. Use of CNCs (or CNFs) and VitaC yield exceptionally strong hydrogels without any sacrifice in adsorption capacity. Whilst strong GO hydrogels are often prepared using hydrothermal treatment in high-pressure vessels at high temperatures, e.g. 180° C., the current methodology presented herein does not require sophisticated reaction vessels, can be performed at much lower temperatures and the resulting hydrogels demonstrate superior performance in comparison with comparable material The morphology and pore size of the hydrogels were investigated using a scanning electron microscope (SEM, Hitachi SU3500) using secondary electrons accelerated at 5 kV. The freeze fractured samples were freeze-dried at −80° C. prior to SEM imaging. VC reduction resulted in partial restoration of the sp2 carbons which imparted electrical conductivity to the samples; hence, they were not sputter-coated with a conductive alloy. The surface chemistry of the samples was studied using X-ray photoelectron spectroscopy (XPS, Thermo Scientific K-Alpha). Freeze dried samples were studied using a monochromatic Al Kα X-ray source under a $10^{-8}$ mbar vacuum. High resolution C1s peaks were recorded and deconvoluted to their constituent peaks using XPSPEAK41™ software. Raman spectra were collected using a Senterra Raman confocal microscope (Bruker). He-NE laser with a wavelength of 532 nm was used in all measurements. The storage modulus of the hydrogels in the wet state was measured using a rheometer (AR-2000, TA Instruments) using a parallel plate setup. Thin slices of the hydrogels were cut with a sharp surgical blade and placed between the parallel plates. The hydrogels were coated with a thin layer of silicon oil to avoid the discharge and evaporation of water. The samples were investigated in a frequency sweep mode (0.1-100 Hz) at a constant strain of 0.002.

Figures 14A, 14B, 14C, 14D, 14E, 14F, 14G, 14H, 14I, 14J, 14K, 14L:
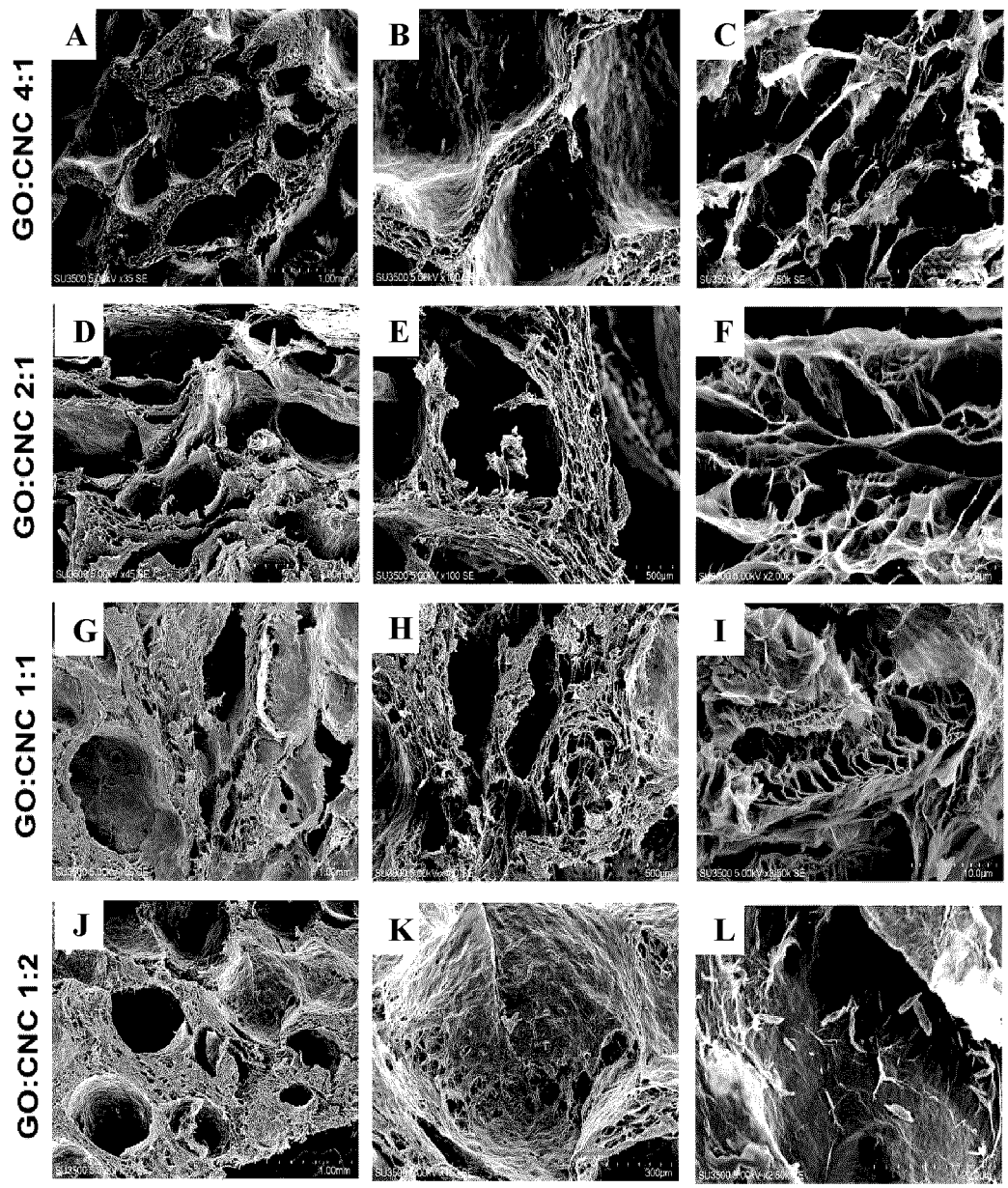
FIGS. 14A to 14L illustrate SEM micrographs of the freeze-fractured surfaces of GO:CNC 4:1 (14A-14C), GO:CNC 2:1 (14D-14F), GO:CNC 1:1 (14G-14I), and GO:CNC 1:2 (14J-14L) hydrogels.

Introducing CNCs to the hydrogels also significantly affected the morphology of the milli- and micron-pores. Because the pore morphology in GO:VC 150 was very close to the desirable well-defined honeycomb structure, for GO:CNC samples, the ratio of GO:VC was fixed at 1:150 and different amounts of CNCs were used to determine the optimum recipe. As expected, by increasing the CNC content, the walls separating the larger milli-pores became thicker and the pore sizes defined by them became smaller (FIGS. 14a to 14l). This is due to the accumulation of CNCs in the pore walls. The transition of milli-pore size and their corresponding wall thickness can be clearly seen in hydrogels containing low (GO:CNC 4:1, FIG. 14a) and high amounts of CNCs (GO:CNC 1:2, FIG. 14j). At the micron-pore length scale, adding CNCs results in a larger and more exfoliated pore structure. Due to their anisotropic rod-shaped geometry, CNCs expanded the space between pore walls (which is often comprised of multi-stacked GO sheets) and exfoliated them into accordion-shaped structures (FIGS. 14f and 14i). The strong hydrogen bonding between the GO and CNCs is likely controlling their interaction. Although the exfoliation of GO sheets results in the thinning of the pore walls, the strong hydrogen bonding between GO and CNCs and the abundance of CNC nanorods compensated for the loss in the structural order (i.e. well defined pore structures, such as FIGS. 14i and 14l) caused by exfoliation; the CNCs provided a robust scaffold that holds the GO nanosheets in place. In addition, the exfoliated micron-pore structure increased the available exposed surface area of the hydrogels, which is beneficial for contaminant adsorption. However, excessive amounts of CNCs (GO:CNC 1:2) resulted in their aggregation (FIG. 14l) which could possibly impact the mechanical properties of the hydrogels.

Figures 14M, 14N, 14O, 14P:
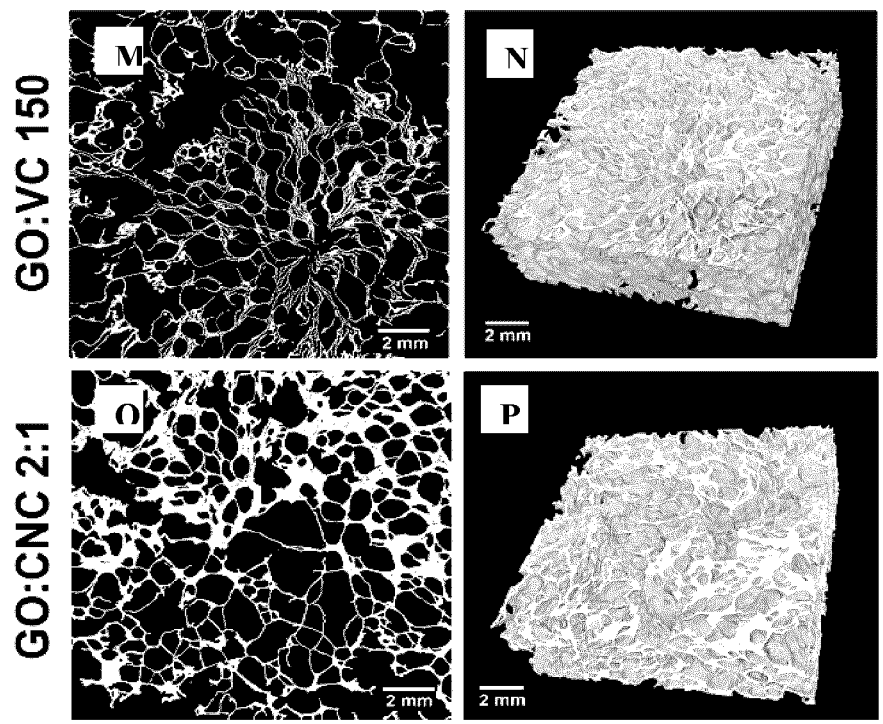
FIGS. 14M to 14P illustrate X-ray tomography images of segmented 2D slices from microCT of GO:VC 150 (14M) and GO:CNC 2:1 (14O) hydrogels, and of 3D renderings of microCT images of GO:VC 150 (14N) and GO:CNC 2:1 (14P) hydrogels.

To obtain a better view of the unique pore structure of the hydrogels, GO:CNC 2:1 and its non-CNC containing counterpart GO:VC 150, were studied using X-ray tomography at different scales (microCT and nanoCT). The difference in electron density between walls (comprised of GO or GO-CNC) and pores (comprised of air) provides sufficient absorption contrast for attenuation based X-ray imaging. Rendered 3D reconstructions from microCT are shown in FIGS. 14N and 14P, alongside representative segmented 2D slices (FIGS. 14M and 14O) that illustrate the detailed pore network in these samples. The 3D reconstructions allowed the study of pore structure and their interconnectivity at any given point or angle of the hydrogels, thus enabling to comment on the statistical distribution of the pores within the hydrogels. Videos of the 3D reconstructed hydrogels, giving a 360° view of the samples, were recorded.

In agreement with SEM observations, adding CNCs resulted in thicker and denser pore walls (FIGS. 14M-14P). Since the fine details of micron-pores were not readily evident in microCT reconstructions, the micron-pores in GO:CNC 2:1 were scanned and reconstructed with a high resolution nanoCT device. The interconnected nature of the micron-pores is clearly visible in the nanoCT reconstruction.

Figure 14Q:
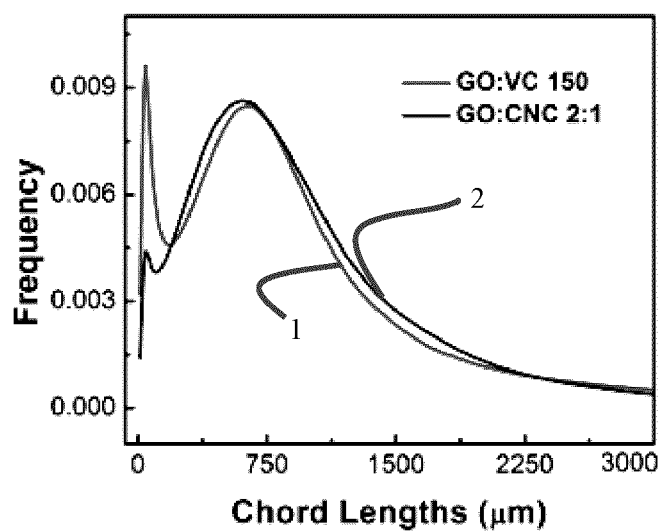
FIG. 14Q illustrates a bimodal chord length distribution.

Since microCT provides a unique opportunity to visualize almost all of the pores in a relatively large volume of the hydrogel, the chord length distribution (CLD), a function which is proportional to the pore size distribution of the hydrogels, was calculated (FIG. 14Q). Both samples show a bimodal CLD, confirming the hierarchical pore structure observations from SEM imaging. Based on the CLD analysis, the modes of micron- and milli-pore sizes of the GO:VC 150 hydrogel were found at 43 and 647 µm, respectively (total average pore size was 1038 µm). The modes of micron- and milli-pore sizes of the GO:CNC 2:1 hydrogel were comparable with values of 40 and 650 µm (total average pore size was 1011 µm). However, the frequency associated to the mode of the micron-pores for the GO:CNC 2:1 hydrogel was less pronounced than that of the GO:VC 150 sample.

Figure 15A:
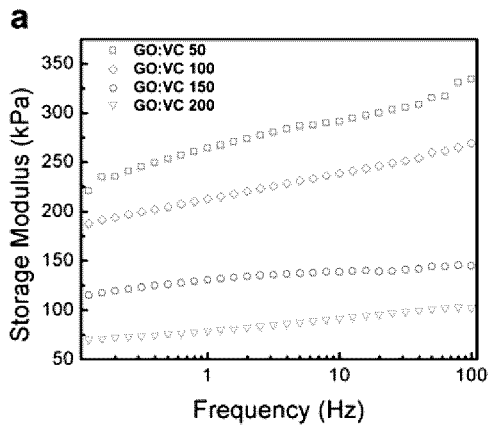
FIGS. 15 and 15B illustrate the storage modulus of GO:VC (15A) and GO:CNC (15B) hydrogels, where the ratio of GO:VC in 15B is 1:150.
Figure 15B:
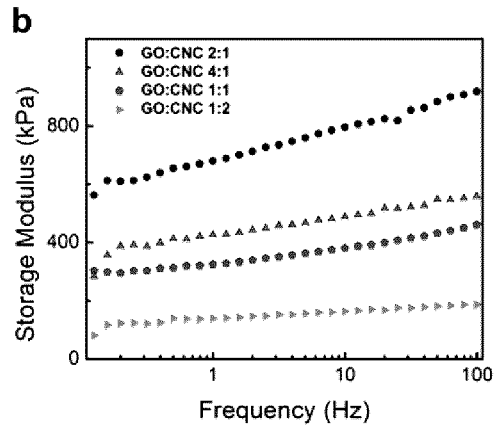

Increasing the VC content of the hydrogels resulted in well-defined and ordered porous structures; however, it had an adverse effect on the storage modulus of the hydrogels. FIG. 15a shows that the storage modulus of the hydrogels decreased with increasing VC content over a wide range of frequencies. The decrease in storage modulus could be a result of the remarkably porous structures of high VC content hydrogels, whereas low VC content hydrogels such as GO:VC 50 were less porous. In high VC content hydrogels, the VC was washed out after hydrogel formation, leaving behind large pores which decreased the storage modulus of the hydrogels. However, adding CNCs to the hydrogels compensated for the loss of storage modulus at high VC content (FIG. 15b). Introduction of CNCs successfully reinforced the hydrogels whereby the storage moduli of GO:CNC 2:1 and GO:CNC 4:1 were 5.5 and 2.5 fold larger than their non-CNC containing counterpart GO:VC 150, respectively (FIG. 15A). However, increasing the CNC content too much (e.g., in GO:CNC 1:1 and GO:CNC 1:2) resulted in the deterioration of the mechanical properties due to aggregation of CNCs and a decrease of order in the pore wall structure due to exfoliation of GO sheets, as evidenced by SEM (FIGS. 14g to 14l and 15b). The superior mechanical properties of GO-CNC hybrid hydrogels are due to (i) well-defined hierarchical pore structure, (ii) exfoliation of the otherwise stacked GO sheets by CNC nanorods, and most importantly, (iii) formation of a CNC scaffold phase which acted as a support for GO sheets. The exceptionally high storage modulus of ~800 kHz at 10 Hz for GO:CNC 2:1 is one of the highest values reported in the literature for GO hydrogels (see Table 3 below). Moreover, this ultra-strong hydrogel was achieved using a mild formation mechanism at low temperature and near ambient pressure. Due to its superior mechanical properties and well-ordered microstructure, GO:CNC 2:1 was selected for the key contaminant adsorption experiments.

Rheometry

Figure 16:
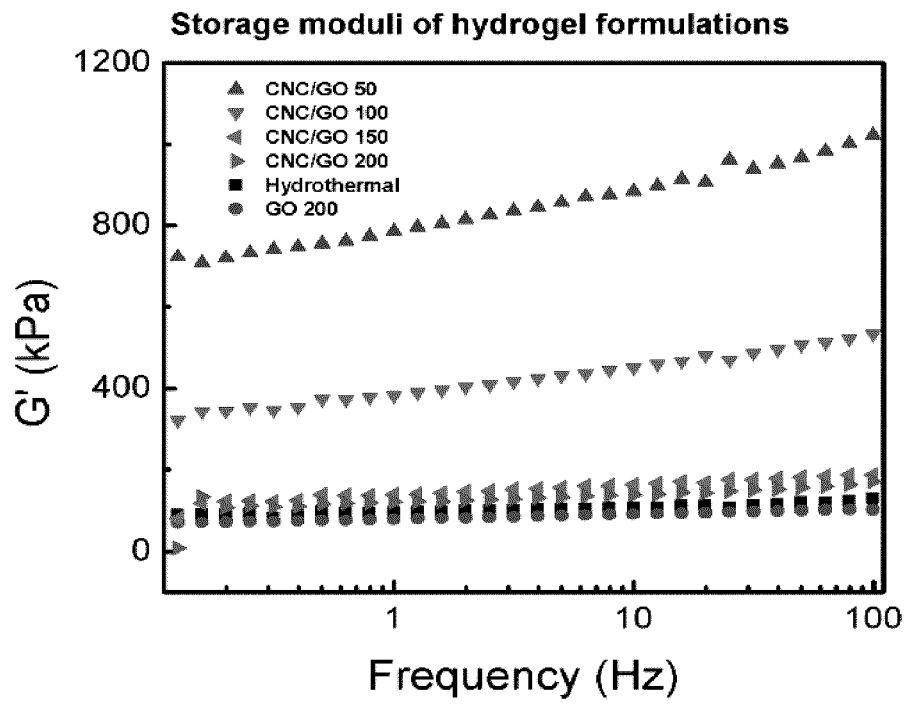
FIG. 16 depicts the results of rheological testing on graphene-oxide/cellulose nanocrystal hydrogels according to embodiments of the invention.

The storage moduli of graphene oxide (GO) and GO/cellulose nano-crystal hydrogels were measured using a parallel-plate rheometer over a frequency range of 0.1-100 Hz. These results are depicted in FIG. 16. A comparison was also made with a hydrothermally-prepared GO hydrogel which is a popular method for preparation of GO-based 3D structures. Embodiments of the invention are labelled GO XXX for graphene oxide (GO) hydrogels and CNC/GO XXX for GO/CNC hydrogels wherein XXX is the 1:XXX ratio of VitaC to the nanoparticles.

As is apparent, the storage moduli of GO/CNC hydrogels prepared by the method according to embodiments of the invention is higher than that of hydrothermally-prepared hydrogel. Adding CNCs remarkably enhances the modulus which is important as a robust mechanical performance for sorbents is a critical factor which determines their service-life, especially in turbulent and high shear environments. A comparison with the available literature was also made to further demonstrate the superior mechanical performance of the prepared hydrogels (Table 3). The mechanical properties of the GO and GO/CNC hydrogels according to embodiments of the invention outperform those of the majority of the hydrogels reported to date. To the best of the inventors' knowledge, the CNC/GO hydrogel with a VitaC:GO ratio of 50:1 is the strongest GO-based hydrogel reported to this date. It should be noted that the highest reported value for GO hydrogels was achieved by use of a hydrothermal method at high temperature (180° C.), while the hydrogels according to embodiments of the invention were processed by a much milder method, yet show exceptionally high mechanical strength. When scaled up, the lower processing temperature and the fact that a high-pressure vessel is not required for preparing the hydrogels translate into a lower cost of production which can be very attractive for relevant industries.

TABLE 3

Rheometry Performance of Representative CNC/GO:VitaC Hydrogel-NP Samples According to Embodiments of the Invention relative to the Prior Art

| Material | Modulus @ 10 Hz (kPa) | Measurement method |
|---|---|---|
| PRIOR ART | | |
| GO | 0.3 | rheometry |
| GO | 1.5 | rheometry |
| GO/hyaluronic acid | 1.8 | rheometry |
| GO/Polyacrilamide | 6.5 | rheometry |
| GO | 13.5 | UTS |
| GO | 15 | UTS |
| GO/Alginate/PAM | 30 | Rheometry |
| GO/SDC | 40 | rheometry |
| GO (peroxidized) | 60 | DMA |
| GO | 130 | UTS |
| EMBODIMENT OF THE INVENTION | | |
| CNC:GO 2:1 (VC = 150) | 800 | rheometry |
| CONTROL | | |
| GO (Hydrothermal control) | 108 | rheometry |

Contaminant Adsorption

Methylene blue (MB, Sigma-Aldrich) and, Cu2+ and Cd2+ were used as model organic dye contaminant and heavy metal ions, respectively. Sulfamethoxazole (SMX) and Tetracycline (TC), two major antibiotics, Diclofenac (DCF), a non-steroidal anti-inflammatory drug, and 17-α-ethynylestradiol (EE2), a synthetic hormone, were selected as representative emerging contaminants. Microcystin-LR (MLR) is a cyanotoxin produced by various cyanobacteria and was used as a representative environmental toxin.

The adsorption performance of GO/CNC hydrogels was determined experimentally with batch tests. As with the GO hydrogels in respect of Section A contaminated water spiked with methylene blue (MB), diclofenac (DCF) and sulfamethoxazole (SMX) were treated by the CNC/GO hydrogels according to an embodiment of the invention.

Batch adsorption experiments were performed in a 600 mL beaker to investigate contaminant adsorption kinetics and to prepare adsorption isotherms. In a typical kinetics experiment, a 200 mL aqueous solution of the contaminant (at a known concentration) was transferred into the beaker. Hydrogels with known GO and CNC content were then introduced to the beaker under continuous mixing by a platform shaker (New Brunswick Instruments). 250 µL aliquots of the aqueous solution were removed after 0, 5, 10, 15, 20, 30, 60, 120, 180 and 240 mins for measuring the concentration of the remaining contaminant.

Table 4 shows the uptake of MB with the hydrogels with and without CNC as well as other GO 3D structures reported in the literature. GO/CNC hydrogels reported herein outperform the majority of reported cases in terms of MB uptake (MB is a classical model contaminant for evaluation of sorbents). Although the reported 3D GO/biopolymer gels exhibit better MB adsorption performance than CNC/GO hydrogels, the reported high MB uptake capacity was achieved at the expense of mechanical robustness, e.g., re-dispersion of GO. Whilst the researchers for the 3D GO/biopolymer did not report the mechanical properties of their hydrogels, it is apparent from their published research to clearly see re-dispersion of the hydrogels in water, which defeats the original purpose of rationally designing a 3D structure with the advantage of being recoverable after use. This recoverability allows for easy application and reduces the need for complex separation processes post water treatment. It should be stressed that the GO/CNC hydrogel reported herein provides a solid balance of mechanical strength and adsorption capacity. An additional advantage for these GO/CNC hydrogels is the possibility for reuse upon recovery. The contaminants adsorbed can be desorbed and the gels can be used again to perform additional cycles of water treatment.

TABLE 4

Absorption Capacity of Representative CNC/GO:VitaC Hydrogel-NP Samples According to Embodiments of the Invention relative to the Prior Art and Go:VitaC Samples According to Other Embodiments of the Invention

| Material | Adsorption Capacity (mg/g) |
| --- | --- |
| PRIOR ART | |
| Reduced GO-based hydrogel | 7.85 |
| Cylindrical graphene-CNT hybrid | 81.97 |
| GO aerogel | 96-125 |
| Ni-doped graphene/carbon cryogel | 151 |
| Graphene sponge | 184 |
| EMBODIMENT OF THE INVENTION | |
| VC 150 | 850 |
| CNC:GO 2:1 (VC = 150) | 850 |

The concentrations of MB and TC were measured using UV-Vis spectrophotometry (Infinite 200 PRO microplate reader, Tecan) since they have a distinctive absorption peak at 664 and 357 nm, respectively. Clear 96-well plates (Corning) were used for measurements, whereby the wells were filled with 250 µL aliquot samples. Inductively coupled plasma-atomic emission spectroscopy (ICP-AES, Icap 6000, Thermo Fisher Scientific) was used to measure the concentration of Cu2+ and Cd2+. Standard concentration-emission curves were developed for each heavy metal. For SMX, DCF, EE2 and MLR (Sigma-Aldrich), high pressure liquid chromatography (HPLC) analysis was conducted on an Agilent 1050 HPLC system equipped with an autosampler, a quaternary pump and a variable wavelength detector with a cell volume of 11 µL. The emerging contaminants (SMX, EE2 and DCF) and MLR were detected by measuring absorbance at 270 and 238 nm, respectively and standard concentration-absorbance curves were developed for each compound. All experiments were performed at room temperature (~22° C.).

Hydrogels with known weights were placed in flasks containing DI water contaminated with known concentrations of methylene blue (MB; a model dye), sulfamethoxazole (SMX; a non-steroidal anti-inflammatory drug) or diclofenac (DCF; an antibiotic), and aliquots of the contaminated solutions were taken at certain time intervals for measurement of the remaining contaminant concentration. The kinetic performance and absolute adsorption capacity of the formulations were investigated and compared with the current open literature.

Figure 17:
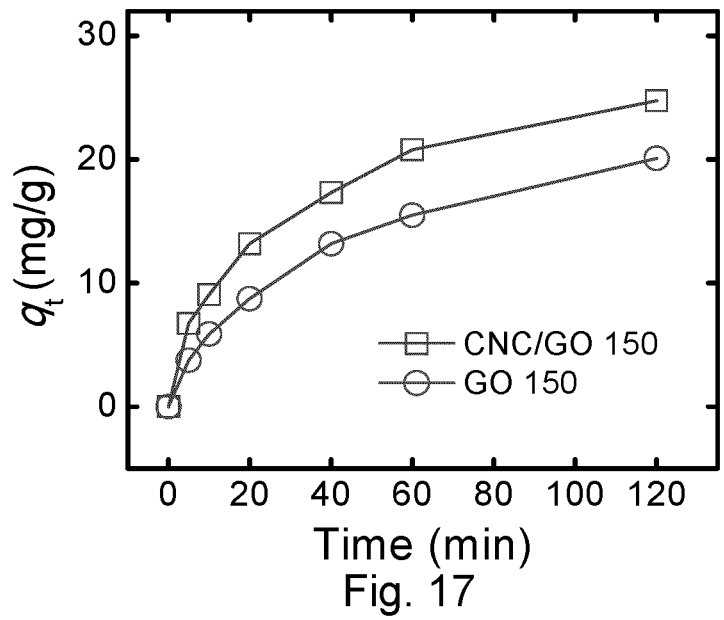
FIGS. 17 and 18 depict the absorption of sulfamethoxazole (SMX) (FIG. 17) and diclofenac (DCF) (FIG. 18) by graphene-oxide and graphene-oxide/cellulose nanocrystal hydrogels according to embodiments of the invention.
Figure 18:
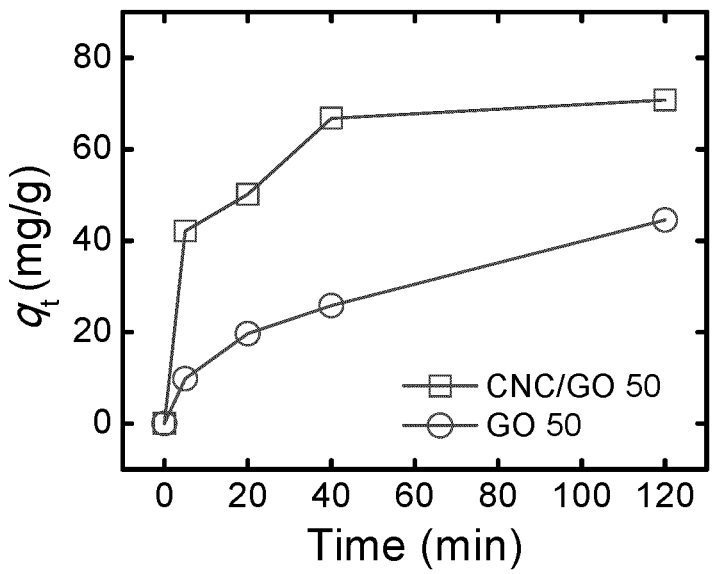

The adsorptive performance of the hydrogels was evaluated using a series of classical and emerging contaminants. MB, a cationic dye, is widely used as a model contaminant for assessing the adsorptive properties of carbon-based sorption materials and structures. There is a general gap in literature with respect to treatment of water containing emerging contaminants such as DCF and SMX using 3D GO structures. As depicted in FIGS. 17 and 18 the uptake adsorption for SMX and DCF respectively are shown and the filters perform favorably. In each, the uptake measured as sorbate/sorbent ratio (mg/g) for a CNC/GO 50 hydrogel according to an embodiment of the invention is shown for a two hour time period relative to that of a VC 50 (GO-VitaC) hydrogel.

Adsorption of Emerging Contaminants

Figure 19:
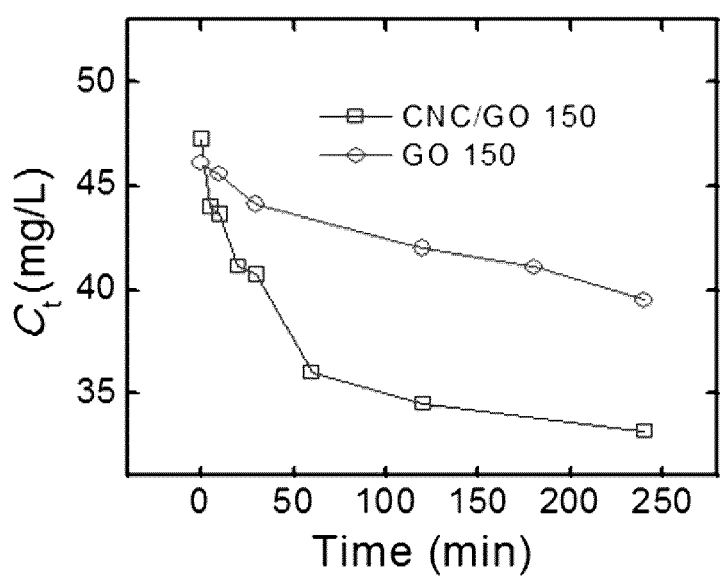
FIG. 19 depicts the absorption of copper by graphene-oxide and graphene-oxide/cellulose nanocrystal hydrogels according to embodiments of the invention.

The adsorption of $Cu^{2+}$ ions was studied. Batch adsorption experiments showed a remarkable increase in the adsorption capacity for $Cu^{2+}$ ions with the incorporation of CNC to the GO/VitaC hydrogels described supra, as depicted in FIG. 19. Table 5 below shows the maximum adsorption capacities in both cases, as well as how they compare to the adsorption capacities of other three dimensional graphene based structures, reported in the prior art.

TABLE 5

Copper Adsorption Performance of Representative CNC/GO:VitaC Hydrogel-NP Samples According to Embodiments of the Invention relative to the Prior Art

| Material | Cu Max. Adsorption Capacity (mg/g) |
| --- | --- |
| PRIOR ART | |
| Graphene oxide nanosheets decorated with $Fe_3O_4$ nanoparticles | 18.3 |
| Graphene oxide aerogel | 19.1 |
| EMBODIMENTS OF THE INVENTION | |
| VC 150 | 26.3 |
| CNC:GO 2:1 (VC = 150) | 69.2 |

Figure 20A:
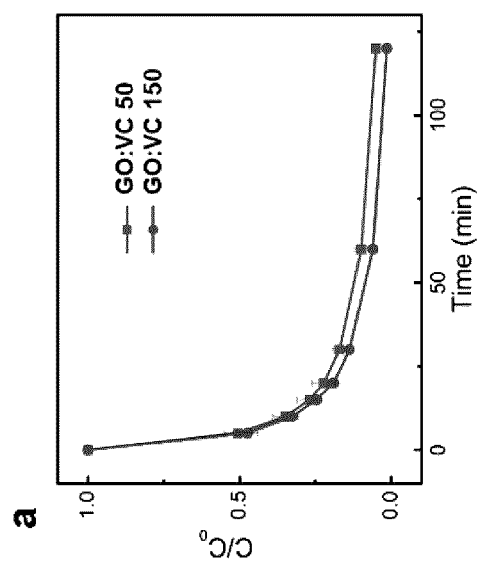
FIGS. 20A to 20D illustrate the adsorption kinetics of MB by GO:VC (20A) and GO:CNC hydrogels (20B), $Cu^{2+}$ and $Cd^{2+}$ heavy metal ions (20C), and emerging pharmaceutical contaminants (20D) such as diclofenac (DCF), sulfamethoxazole (SMX), 17-α-ethynylestradiol (EE2), tetracycline (TC) and cyanotoxin microcystin-LR (cyanotoxin) by GO:CNC 2:1 hybrid hydrogels from aqueous solutions.
Figure 20B:
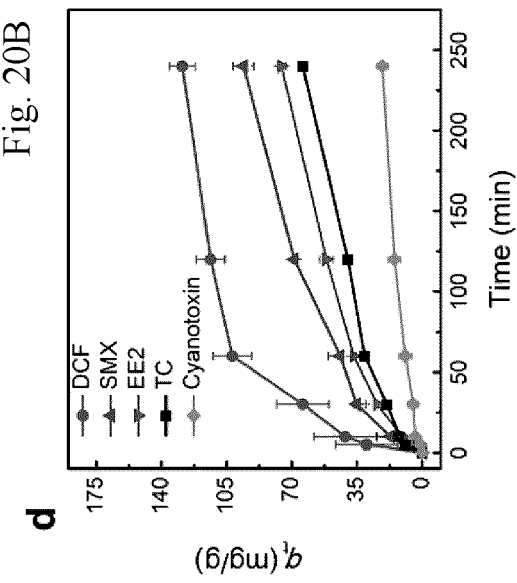

MB adsorption by GO:VC hydrogels containing low (GO:VC 50) and high (GO:VC 150) amounts of VC revealed that the equilibrium adsorption capacity is larger in GO:VC 150 hydrogels (FIG. 20A). The unique hierarchical pore structure of GO:VC 150 was responsible for its better adsorptive performance. Although adding CNCs significantly improved the mechanical properties and pore structure of the hydrogels, it did not influence the adsorption capacity of the hydrogels towards MB (FIG. 20b). Since adding CNCs did not affect the adsorption of MB, it can be inferred that its adsorption is mostly controlled by GO nanosheets rather than CNCs and that CNCs do not provide any additional active sites for MB uptake. The GO:CNC 2:1 hydrogel showed an adsorption capacity of ~850 mg/g, which is among the highest values reported in the literature for hydrogels with GO as sole adsorption material (Table 4). The area occupied by a single MB molecule is ~130 Å$^2$ (Kahr, G.; Madsen, F., *Appl. Clay Sci.* 1995, 9 (5), 327-336); hence, the equivalent monomolecular surface area occupied by MB on the GO:CNC 2:1 hydrogel is calculated to be ~2080 m$^2$/g. The adsorption of MB molecules onto GO:CNC 2:1 hydrogels followed pseudo-second order kinetics which indicated a chemisorption mechanism of interaction between MB molecules and the hydrogel surface. The adsorption kinetics of the GO-CNC hydrogel for MB are 48-fold faster (FIG. 22C) and the maximum adsorption capacity is at least 2-fold higher (Table 8) than that reported for the industry standard in contaminant removal; namely, granular activated carbon (GAC). The significantly faster kinetics and higher adsorption capacity, in addition to the extremely low apparent density of the hybrid hydrogels (~0.01 g/cm$^3$ for hydrogels versus 0.48 g/cm$^3$ for GAC) make them an ideal candidate for industrial water and wastewater treatment.

The rate constants (k) and equilibrium adsorption capacities ($q_{e,calc}$) for the different contaminants are summarized in Table 6.

TABLE 7

| Langmuir Isotherm | |
| --- | --- |
| $q_{max}$ (mg · g$^{-1}$) | 740.3 |
| $k_L$ (mg · L$^{-1}$) | 1.085 |
| $R^2$ | 0.979 |
| Freundlich Isotherm | |
| $k_F$ (mg · L$^{-1}$) | 276.8 |
| n | 2.058 |
| $R^2$ | 0.902 |

Figure 20C:
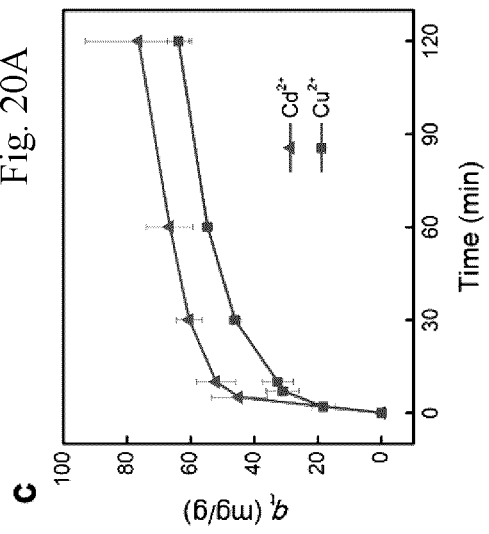

Levels of dissolved heavy metals in natural waters are of increasing concern and have become an important area of study in terms of environmental remediation. Batch adsorption experiments were performed for Cu$^{2+}$ and Cd$^{2+}$. In the case of Cu$^{2+}$, for an initial concentration of 50 mg/L, the system appears to reach equilibrium in approximately 2 h (FIG. 20C), with a maximum adsorption capacity of 63.8 mg/g (~1 mmol/g). For the same initial Cd$^{2+}$ concentration, the system reaches equilibrium at approximately the same time and a maximum adsorption capacity of 90 mg/g (~0.8 mmol/g). When normalized by their molar weights, it can be seen that the hydrogels had a higher affinity for Cu$^{2+}$ rather than Cd$^{2+}$. GO has been shown to have a higher affinity towards Cu$^{2+}$ over Cd$^{2+}$ due to the larger electronegativity of copper ions and higher stability constant of its hydroxides and acetates (the complexes it forms with hydroxyl and carboxyl groups of GO and CNCs) in comparison to its cadmium-based counterpart. The adsorption kinetics of

TABLE 6

Comparison of the pseudo-first and pseudo-second order adsorption rate constants and calculated and experimental qe values

| | MB | Cu$^{2+}$ | Cd$^{2+}$ | DCF | SMX | TC | EE2 | Cyanotoxin |
| --- | --- | --- | --- | --- | --- | --- | --- | --- |
| $q_{e,\,exp}$ (mg · g$^{-1}$) | 178.2 | 63.8 | 91.8 | 128.8 | 96.0 | 148.8 | 117.2 | 21.4 |
| Pseudo-first order kinetic parameters | | | | | | | | |
| $q_{e,\,cal}$ (mg · g$^{-1}$) | 75.6 | 47.4 | 65.5 | 106.9 | 89.5 | 138.7 | 94.1 | 23.0 |
| $k_1$ (min$^{-1}$ × 10$^{-2}$) | 2 | 2.93 | 4.52 | 1.52 | 0.93 | 3.75 | 0.58 | 1.2 |
| $R^2$ | 0.927 | 0.937 | 0.844 | 0.988 | 0.976 | 0.996 | 0.995 | 0.988 |
| Pseudo-second order kinetic parameters | | | | | | | | |
| $q_{e,\,cal}$ (mg · g$^{-1}$) | 181.9 | 65.8 | 84.4 | 126.6 | 106.4 | 134.9 | 112.4 | 27.9 |
| $k_2$ (g · mg$^{-1}$ · min$^{-1}$ × 10$^{-4}$) | 9.80 | 39.10 | 4.95 | 4.83 | 2.53 | 7.69 | 1.40 | 8.66 |
| $R^2$ | 0.999 | 0.989 | 0.994 | 0.975 | 0.962 | 0.905 | 0.902 | 0.913 |

Figures 21A, 21B, 21C:
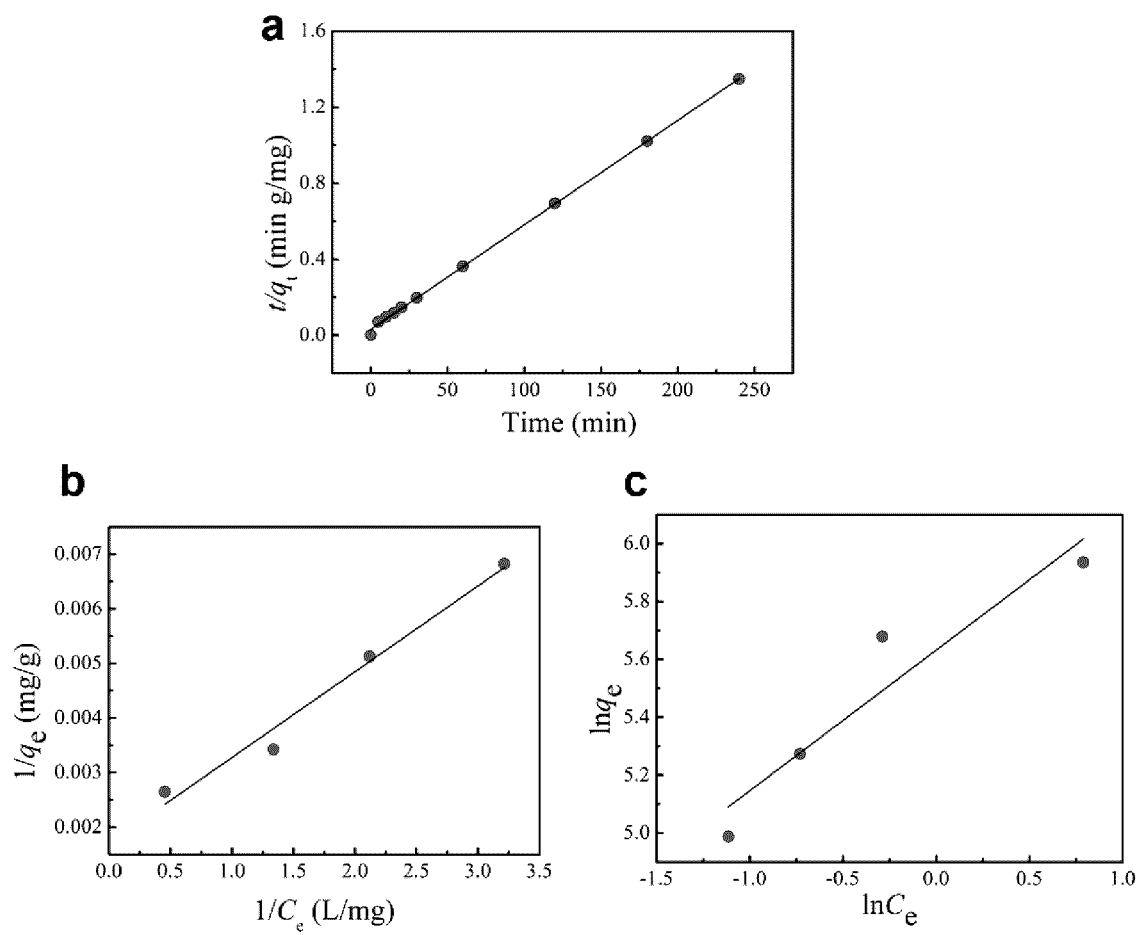
FIGS. 21A to 21C illustrates that MB batch uptake data (21A) could be fitted with the linearized form of pseudo-second order kinetic model, the adsorption isotherms being fitted with Langmuir (21B) and Freundlich (21C) adsorption isotherm models.

The adsorption of MB on GO-based hydrogels and other carbon-based materials such as activated carbon, GO and reduced GO nanosheets and GO hydrogels has been reported to follow pseudo-second order kinetics. The adsorption isotherms for MB uptake by GO:CNC 2:1 were also studied (FIGS. 21A to 21C) at different initial concentrations; a regression analysis using Langmuir and Freundlich adsorption models revealed that the Langmuir model best describes the adsorption of MB on the GO:CNC 2:1 surface, hence MB molecules form a monolayer on the active sites of the hydrogels and the maximum adsorption capacity is controlled by the availability of free adsorption sites on the surface. Table 7 reports the parameters of the Langmuir and Freundlich isotherms for the Adsorption of Methylene Blue by the GO:CNC hydrogels.

Cu$^{2+}$ and Cd$^{2+}$ have a better fit to the pseudo-second order kinetic model, which coincides with previous kinetics studies for adsorption of copper ions onto carbon-based material. Overall, the hydrogels have a high potential to uptake heavy metals and application for environmental remediation is plausible. The presence of ion chelating groups such as hydroxyls and carboxyls on both GO and CNCs is the reason behind the hydrogel's affinity to metal ions.

Figure 20D:
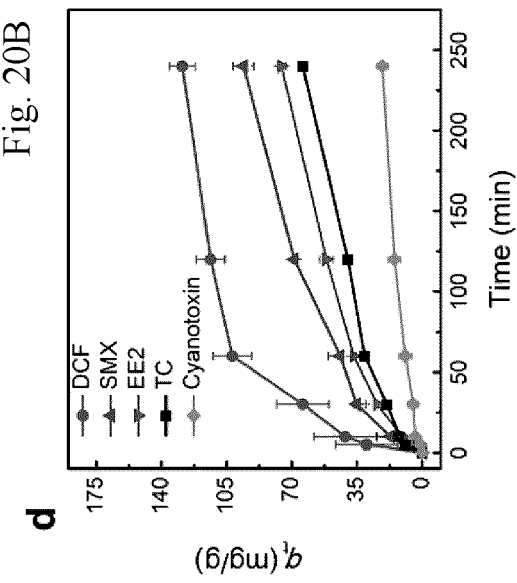

Discharge of pharmaceutical compounds and other emerging contaminants into water resources has created significant challenges for wastewater treatment plants as most of them are not equipped with technologies to tackle this new class of pollutant. The GO:CNC 2:1 hydrogel successfully adsorbed a variety of common pharmaceuticals (see Table 8) such as antibiotics (SMX and TC), an anti-inflammatory drug (DCF) and a hormone (EE2) due to the versatile chemistry of the hybrid hydrogel (FIG. 20D). The adsorption of microcystin-LR (cyanotoxin), a toxin produced by cyanobacteria is also investigated. The cyanotoxin follows a pseudo-first order model, suggesting a physical adsorption process—likely a hydrogen bonding. Comparing to literature, the hydrogels created in this study show an adsorption potential for pharmaceutical compounds (SMX, DCF, EE2) on par or better than other carbonaceous materials (Table 8). For cyanotoxins, reports have shown that the range of uptake onto nine specific activated carbons is between 4 and 200 mg/g.

TABLE 8

Comparison of the adsorption capacities of GO:CNC 2:1 hydrogel with activated carbon (AC) for various contaminants

| Contaminant | Granular Activated Carbon | GO:CNC 2:1 |
|---|---|---|
| | Adsorption capacities (mg/g) | |
| MB | 400 | 850 |
| DCF | 64 | 129 |
| SMX | 71 | 107 |
| TC | 455 | 149 |
| EE2 | 20 | 117 |
| $Cu^{2+}$ | 15 | 65 |
| $Cd^{2+}$ | 5 | 90 |
| MC-LR | 16-83 | 22 |

The adsorption of contaminants from a single component aqueous solution is expected to be different from that of water contaminated with multiple pollutants (i.e., a complex water matrix) due to competition between the individual components for the active sites of the hydrogel. To assess the performance of hydrogels for multicomponent solutions, a complex matrix composed of MB, TC, $Cu^{2+}$ ions and humic acid, each at a concentration of 15 mg/L, was used to simulate wastewater. Humic acid was added to simulate a real wastewater in which the presence of natural organic matter could preclude the uptake of targeted contaminants.

Competitive adsorption occurs with MB when multiple contaminants are present in solution; however, $Cu^{2+}$ remains relatively unaffected (FIG. 22A).

In developing hydrogels for water treatment, it is of considerable interest to validate the reusability of the hydrogels following contaminant adsorption. To verify the reusability of the ultra-strong hydrogel, MB was adsorbed onto GO:CNC 2:1, then desorbed using 4M sulfuric acid and DI water and monitored with respect to adsorptive performance. Three full cycles of adsorption and desorption were completed and the hydrogels showed an impressive resilience to this process. FIG. 22B shows the adsorption kinetics for each cycle. It is clear that there was a reduction in adsorption rate for each cycle while the equilibrium adsorption remained unaffected, leading to an eventual complete uptake of the MB. Furthermore, no signs of physical degradation of the reused GO:CNC 2:1 hydrogel were noted by visual inspection. Compared to more common adsorbents such as activated carbon, which requires high energy for regeneration, it appears that the GO:CNC 2:1 hydrogel of this study has a significant potential for reuse. Further, as apparent from FIG. 22C, the hydrogel of the present invention has a marked superiority over NORIT and BRITA, having a MB absorption of 14.3 mg/g·min. for the hydrogel of the present invention vs. 4.6 mg/g·min and 3.5 mg/g·min respectively for NORIT and BRITA.

CONCLUSIONS

An ultra-strong and highly adsorptive hybrid GO-CNC hydrogel was processed using a facile green synthesis method with VC at low temperature and near ambient pressure. VC not only acted as a green reducing and gelling agent, but also directed the assembly of the GO nanosheets into hierarchically porous 3D hydrogels. The use of excess VC resulted in the selective wrapping of the undissolved VC grains with GO sheets, creating milli-pores when the VC was dissolved by DI water wash. At a much smaller length scale, the self-assembly of GO as a result of VC reduction at 95° C. resulted in well-ordered pores of few microns in diameter (micron-pores). CNCs contributed to the microstructure by exfoliating the restacked GO nanosheets at the micron-pore walls and also contributing to the mechanical integrity of the hydrogels by providing a robust scaffold that held the GO nanosheets in place. The interplay between the role of VC and CNC content in the hydrogels provided an effective tool to tailor the microstructure and, hence, the properties of the hydrogels. By choosing the optimum amount of each component, an ultra-strong hydrogel with an exceptional storage modulus of 800 kPa and a remarkable MB adsorption capacity of 850 mg/g was processed. The reusable hydrogel also showed excellent adsorption capacity towards heavy metal ions, pharmaceuticals, emerging contaminants and multicomponent complex waters.

Example 3

Benefits of Excess VC for GO Hydrogel Formation

Figure 23A:
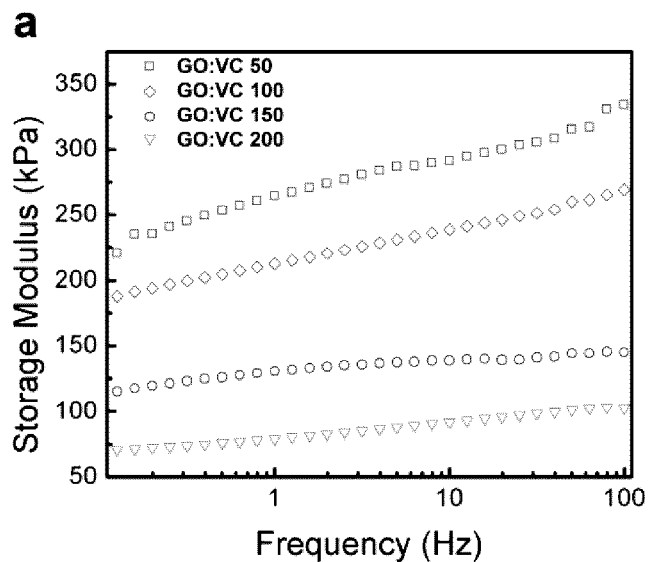
FIG. 23A illustrates the storage modulus of GO:VC hydrogels.
Figure 23B:
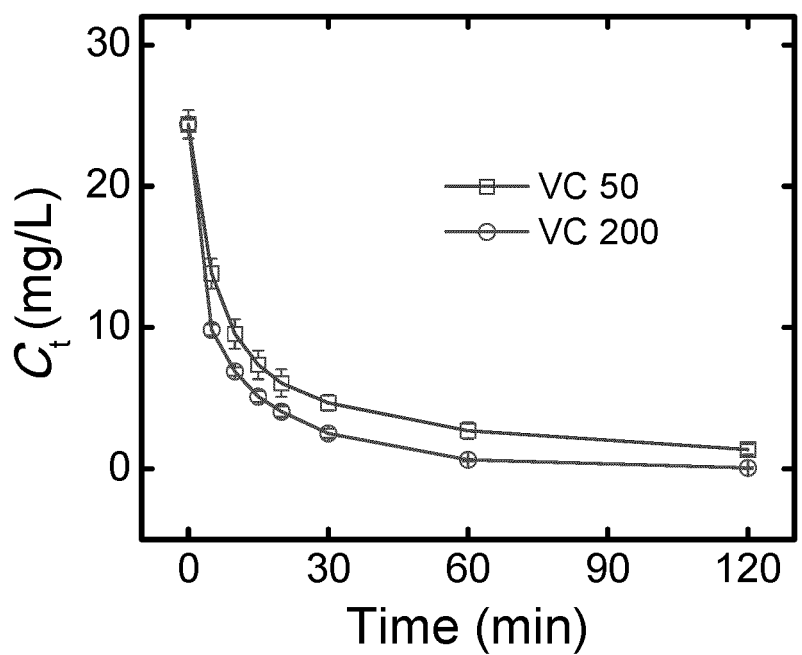
FIG. 23B illustrates the adsorption performance of two different GO:VC hydrogels for adsorption of MB, where the ■ symbols are for GO:VC 1:50 and the ● symbols are for GO:VC 1:200.

VC acts as a gelling agent for GO when it is added at above the stoichiometric ratio of GO:VC 1:3. When heated at 95° C. for 3 hrs, the stoichiometric mixture of GO and VC resulted in a solid gel (Chen and Yan, 2011). Sui et al heated a GO:VC 1:10 mixture for 6 hrs at 80° C. until it transformed into a hydrogel (Sui et al, 2011). In another study, Sui et al heated a GO:VC 1:5 mixture at 50° C. for 12 hrs to form hydrogels (Sui et al, 2012). However, none of these studies report the mechanical properties of the resulting hydrogels. The work reported herein shows that GO:VC hydrogels that are formed at near stoichiometric conditions lack the mechanical robustness for practical water treatment applications. In fact, the samples are so weak that their properties cannot be measured in the rheometer (the samples break apart), hence the absence of any numerical data to demonstrate this. To a certain extent, the use of excess amounts of VC increases the mechanical strength, but also has a significant effect on the pore structure of the resulting hydrogels, which translates into better mechanical and contaminant adsorption performance. In the work leading to the present invention, it was found that there is a trade-off to be made with regards to mechanical strength of the hydrogel and its performance as an adsorbent. At high GO:VC ratios, it was noted that the mechanical strength of the hydrogel starts to decrease with increasing VC content (FIG. 23A), yet, the adsorption performance increases (FIG. 23B). Nonetheless, at these high GO:VC ratios, the storage modulus is very high compared to the state-of-the-art (note that the hydrogels of the present invention are not formed using an energy expensive hydrothermal technique which is known to yield generally high storage moduli).

Example 4

Column Studies

Figure 24A:
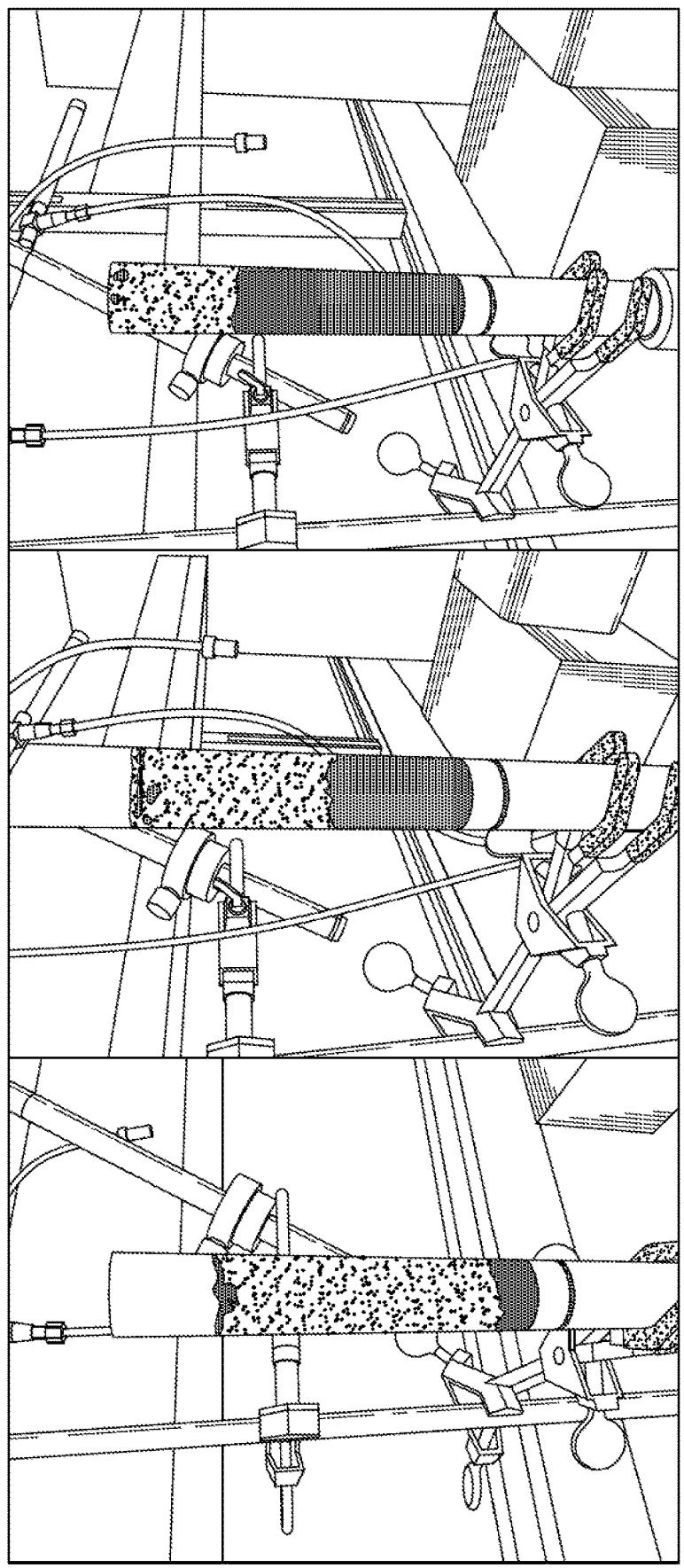
FIG. 24A illustrates the packing of glass column with hydrogel and quartz sand buffer layer.
Figure 24B:
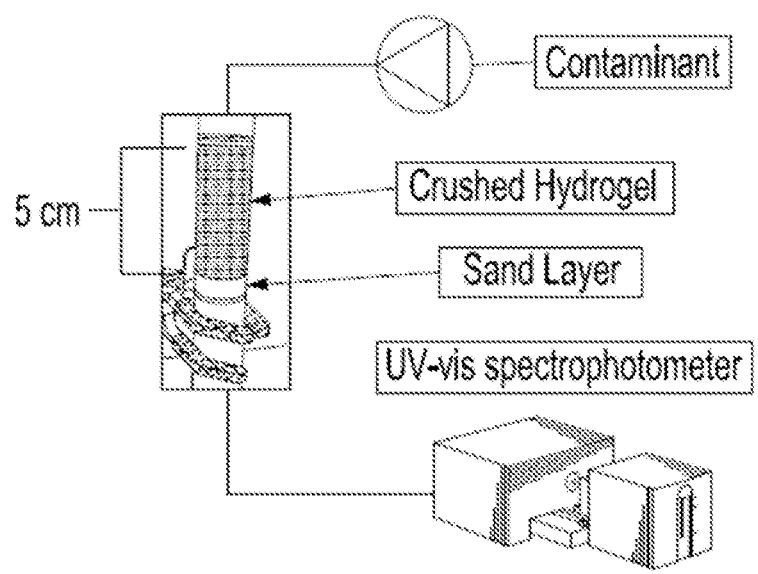
FIG. 24B illustrates the schematic of column study setup.

Flow-through studies were conducted using an adjustable length glass column of 1 cm inner diameter (GE Life Sciences). A packing protocol was developed and is illustrated in FIGS. 24A and 24B. Granular quartz sand was used as a buffer layer between the bottom of the glass column and the crushed hydrogel.

The granular quartz sand material had a mean particle size of 256 μm. The porosity of the water-saturated quartz sand was 0.36. A fabricated hydrogel was manually crushed to a consistency and wet packed into the column to a height of 5 cm above the quartz sand. Care was taken to ensure that no air pockets were present during the packing procedure. The porosity of the water-saturated hydrogel was 0.70. A peristaltic pump (Inatech) was used to initiate a flow through the column from top to bottom which was then directly connected to a UV-visible spectrophotometer (Agilent HP8453) in order to monitor effluent concentrations.

Methylene Blue

The column was equilibrated with 6 pore volumes (PV) of DI before MB (50 mg/L) was added from a covered beaker at a flow rate of 0.5 mL/min. The effluent was monitored in real-time using UV-visible spectroscopy at a wavelength of 664 nm using a 1 cm flow-through quartz cuvette. Absorbance measurements were taken once per minute to achieve a breakthrough curve for the MB.

The reusability of the hydrogels in contaminant uptake was also explored. MB was adsorbed onto a hydrogel, then desorbed using 4M sulfuric acid and DI water. Three full cycles of adsorption and desorption were completed and the hydrogels showed an impressive resilience to the process. This initial reusability study was performed in batch testing but in treatment application, an in situ regeneration is often more desirable. Hence, a similar cyclic adsorption and desorption of MB was performed in a flow-through column arrangement where MB was fed through the column until equilibrium was reached, after which a desorption cycle was performed by feeding 4M sulfuric acid (2 h at 0.5 ml/min) and DI water (2 h at 0.5 ml/min) through the column successively. MB (50 mg/L) was then re-introduced into the column. This process was repeated for three adsorption cycles.

Figure 25:
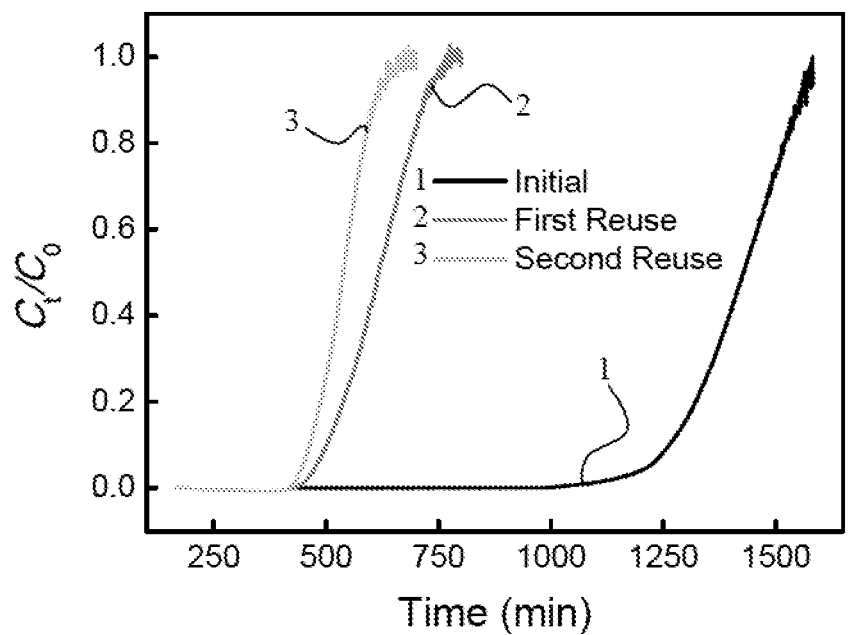
FIG. 25 illustrates the MB Column adsorption reuse cycles.
Figure 26A:
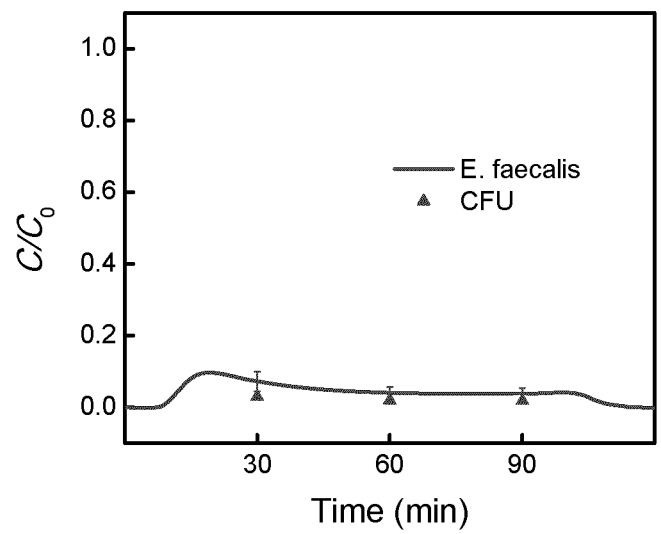
FIGS. 26A to 26D illustrate the *E. faecalis* retention and CFU counts (26A), the *E. coli* retention and CFU counts (26B) (w and w/o NOM), the *E. coli* retention 10 mM vs. 100 mM KCl (26C), and the *E. coli* retention Sand vs. Hydrogel at 100 mM (26D)
Figure 26B:
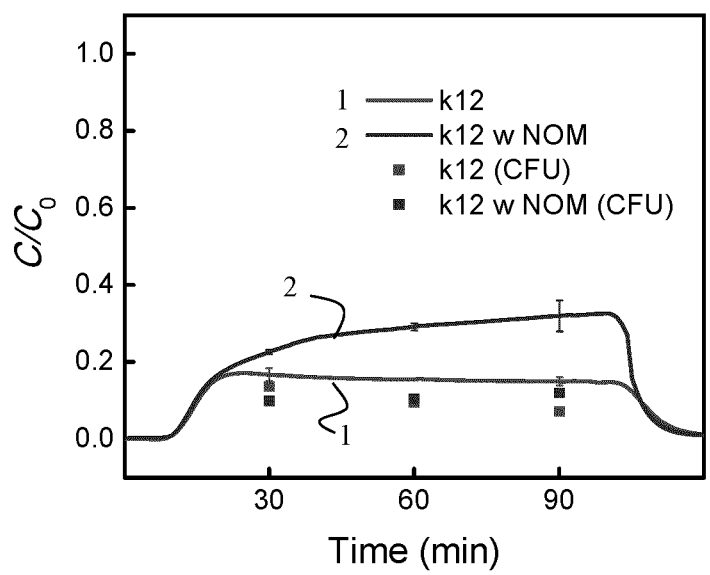
Figure 26C:
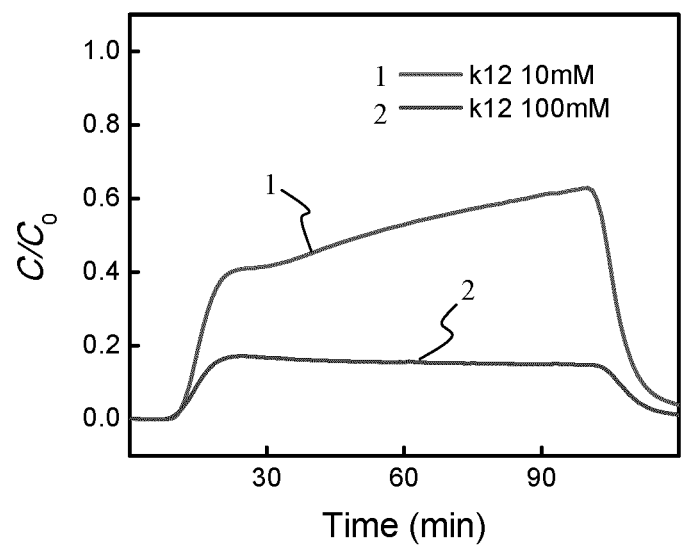
Figure 26D:
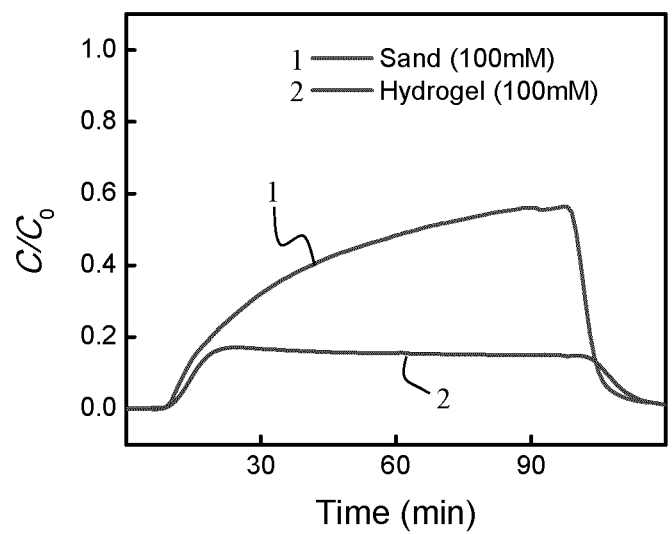

The results reported in FIG. 25 are the first to show application of this novel hydrogel in a packed column form and the crushed hydrogel maintained a very high MB adsorption capacity. A $q_{max}$ of 850 mg MB/g GO was achieved, which is equal to the amount taken up in batch experimentation. It has been shown previously that these particular hydrogels exhibit pseudo-second order kinetics and follow a Langmuir isotherm for MB.

Example 5

Bacterial Species and Inoculums Preparation

*Escherichia coli* are Gram-negative rod-shaped bacterium often used as model bacteria. Some strains can cause serious food poisoning and are occasionally the cause of food contamination. *Enterococcus faecalis* are Gram-positive bacteria that can cause urinary tract infections and other infections in humans.

*E. coli* k12 and *E. faecalis* were streaked from −80° C. stock onto lysogeny broth (LB; Lauria formulation) agar plates and incubated overnight at 35±2° C. 100 mL of LB was inoculated with a single community from the LB agar plate and incubated at 35±2° C. and 130 rpm in a 250 mL sterile culture flask overnight. The resulting culture was then washed by centrifugation for 5 min at 3000×g to form a pellet and resuspended in 5 mL of 100 mM potassium chloride (KCl) buffer solution. Three washes were completed and a final resuspension into 100 mL of 100 mM KCl was performed to achieve an optical density (O.D.) of 0.5-0.6. Optical densities were correlated to viable cell counts and were representative of a cell count of $5.0 \times 10^8$ CFUs. Additionally, *E. coli* was suspended in 10 mM KCl to determine the effects ionic strength has on attachment and aggregation. A comparison between the performances of the hydrogel versus quartz sand was also performed. Equivalent column lengths were used for this control. All transfers and resuspensions were performed inside a class A2 biosafety cabinet with sterile implements. Bacterial suspension was pumped through the packed column in top-down flow (0.5 mL/min) and monitored in real-time using UV-vis spectroscopy at a wavelength of 600 nm. 500 μL aliquots were collected from the effluent at 0, 30, 60 and 90 minutes. The effluents were serial diluted, plated and incubated overnight to determine CFU counts at each time interval. Results reported through FIGS. 26A to 26D report that the hydrogel of the present invention is also useful for removing microbial contaminants from wastewater.

Example 6

Effect of Temperature on Self-Assembly of the Hydrogel

Figure 27:
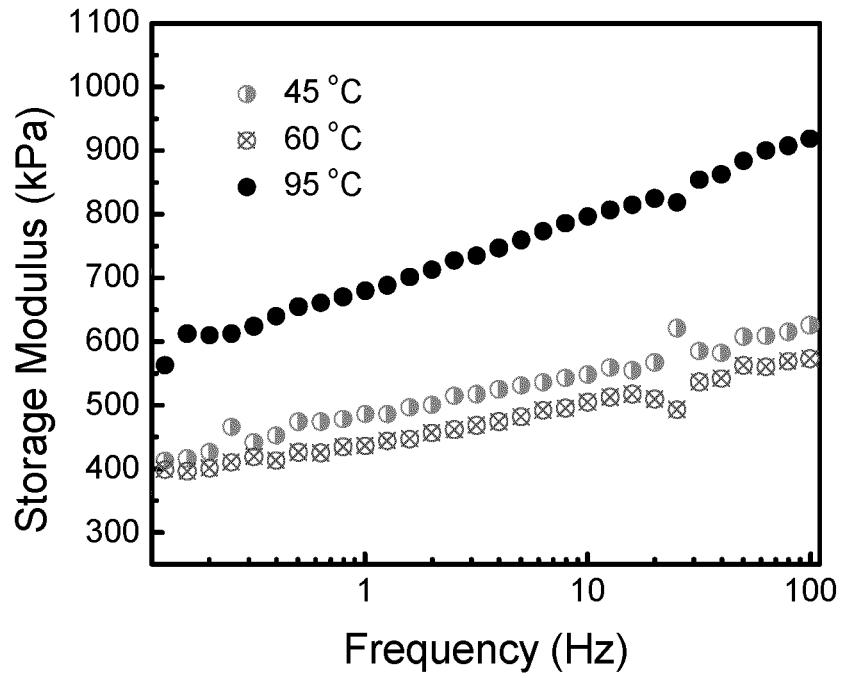
FIG. 27 illustrates the storage modulus of GO:CNC 2:1 hydrogels formed at 45, 60 and 95° C.

To study the effect of formation temperature, GO:CNC 2:1 hydrogels were formed at 45 and 60° C. The samples were kept for 24 h at those temperatures for a solid hydrogel to form. The XPS results of the formed hydrogels showed comparable values to the sample formed at 95° C. (Table 9). Table 9 illustrates results obtained from the deconvolution of the $C_{1s}$ peaks of hydrogels made at 2 different temperature on either graphene oxide gels, GO:CNC 2:1 (VC150) and GO:CNC 2:1 (VC150). FIG. 27 illustrates the storage modulus of the GO:CNC 2:1 hydrogel of the present invention, when prepared at 45° C., 60° C., and 95° C.

TABLE 9

XPS $C_{1s}$ of GO:CNC 2:1 hydrogels formed at various temperatures

| Surface Composition | GO | GO:CNC 2:1 (45° C.) | GO:CNC 2:1 (60° C.) | GO:CNC 2:1 (95° C.) |
|---|---|---|---|---|
| % C=C (sp$^2$) | 21.1 | 50.8 | 65.1 | 58.2 |
| % C—C (sp$^3$) | 12.1 | 18.2 | 10.4 | 4.8 |
| % C—OH | 11.3 | 14.6 | 11.8 | 23.5 |
| % C=O/C—O—C | 36.9 | 10.0 | 8.8 | 7.2 |
| % C—OOH | 18.2 | 6.4 | 4.0 | 6.2 |

The results reported in Table 9 correlate well with those reported in Table 10 below, which reports the deconvolution of the $C_{1s}$ peaks of hydrogels various hydrogels

TABLE 10

Deconvolution of $C_{1s}$ peaks and D/G ratio of hydrogels

| Sample | % C=C (sp$^2$) | % C—C (sp$^3$) | % C—OH | % C=O/C—O—C | % C—OOH | D/G Ratio |
|---|---|---|---|---|---|---|
| GO | 21.1 | 12.1 | 11.3 | 36.9 | 18.2 | 1.7 |
| GO:VC 1 | 24.6 | 17.4 | 10.6 | 36.7 | 10.7 | — |
| GO:VC 10 | 66.2 | 3.0 | 13.7 | 11.5 | 5.6 | — |
| GO:VC 50 | 50.9 | 12.4 | 14.2 | 10.1 | 12.5 | 1.48 |
| GO:VC 100 | 48.0 | 15.8 | 14.1 | 10.0 | 12.2 | 1.46 |
| GO:VC 150 | 41.0 | 20.8 | 12.7 | 13.0 | 12.3 | 1.32 |
| GO:VC 200 | 36.6 | 21.9 | 17.7 | 11.8 | 11.9 | 1.1 |
| GO:CNC 4:1 | 51.3 | 6.0 | 17.2 | 16.9 | 8.6 | 1.33 |
| GO:CNC 2:1 | 58.2 | 4.8 | 23.5 | 7.2 | 6.2 | 1.37 |
| GO:CNC 1:1 | 56.2 | 10.5 | 15.9 | 10.4 | 6.9 | 1.35 |
| GO:CNC 1:2 | 37.2 | 22.4 | 16.4 | 15.8 | 8.3 | 1.39 |

Raman spectroscopy of the hydrogels also revealed that the ratio of D band (~1340 cm$^{-1}$) to G band (~1580 cm$^{-1}$) of the GO:VC samples decreased by increasing the VC content. These measurements provide further evidence for reduction of GO by VC (Table 10). Adding CNCs did not affect the D/G ratio of the hydrogels.

It is clear upon comparing the tables 9 and 10 that hydrogels are being obtained at 45° C. and 60° C. However, when heated at 95° C., it takes about 60 minutes for the hydrogel to self-assemble, whereas 120 minutes are necessary if heated at 45° C.

Figure 28:
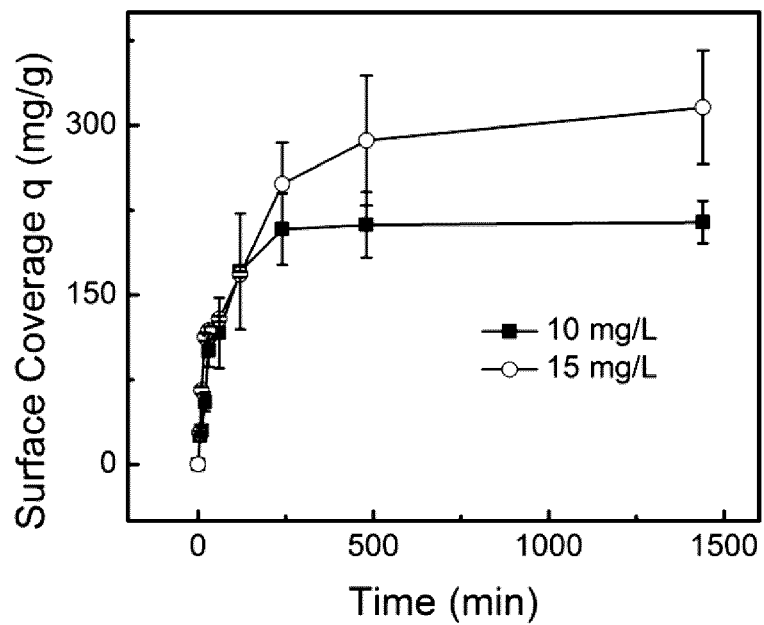
FIG. 28 illustrates the adsorption kinetics of MB by GO:CNC 2:1 hydrogel formed at 45° C.

FIG. 28 illustrates the adsorption kinetics of MB by GO:CNC 2:1 hydrogel formed at 45° C.

Example 7

Decontamination of Air

Graphene oxide hydrogels can also be used as efficient adsorbents for airborne contaminants. Much in the same way as for liquid contaminants evidenced above, the surface chemistry and high specific surface area of graphene oxide is key to its selectivity towards gas phase contaminants (Ma et al., Aerosol and Air Quality Research. 2017 Mar. 1; 17(3):913-22; and Yavari et al., High sensitivity gas detection using a macroscopic three-dimensional graphene foam network. Scientific reports. 2011 Nov. 23; 11, 2). Since GO:CNC hydrogels are decorated with a myriad of chemical functional groups and possess an exceptionally large specific surface area because of their unique hierarchical porous structure, it is believed that they would show remarkable adsorption capacity for a wide range of airborne and gaseous contaminants.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Embodiments of the invention may also be functionalized such that the GO hydrogel includes antimicrobial agents allowing them to provide anti-microbial and anti-biofouling activity. Examples of such antimicrobial agents may include, but are not limited to, bacteriophage and antimicrobial peptides.

Within other embodiments of the invention another target contaminant for sorbents according to embodiments of the invention are nucleic acids, such as DNA and RNA for example allowing sorbents according to embodiments of the invention to address antibiotic resistance genes, which is a problem of increasing concern in wastewaters.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A hydrogel prepared by a method comprising the steps of:
   a) adding vitamin C (VC) to a dispersion GO:VC varying from 1:50 to 1:3000; and
   b) incubating at a temperature above 45° C. the dispersion of a) for a time sufficient for a porous hydrogel to be self-assembled from the dispersion.

2. A hydrogel prepared by a method comprising the steps of
   a) adding in a suspension graphene oxide (GO) to cellulose nano-particles (CNPs) in a ratio GO:CNPs from 4:1 to 1:1;
   b) adding to the suspension of a) vitamin C (CV) in a ratio GO:VC varying from 1:50 to 1:300; and
   c) incubating at a temperature above 45° C. the dispersion of a) for a time sufficient for a porous hydrogel to be self-assembled from the dispersion.

3. A porous self-assembling hydrogel comprising graphene oxide (GO) and cellulose nano-particles (CNPs) in a ratio GO:CNPs from 4:1 to 1:1.

4. The porous self-assembling hydrogel of claim 3, wherein the ratio GO:CNPs is 2:1.

5. A filter comprising the hydrogel of any one of claims 1 and 2-4.

* * * * *